Figure 1:
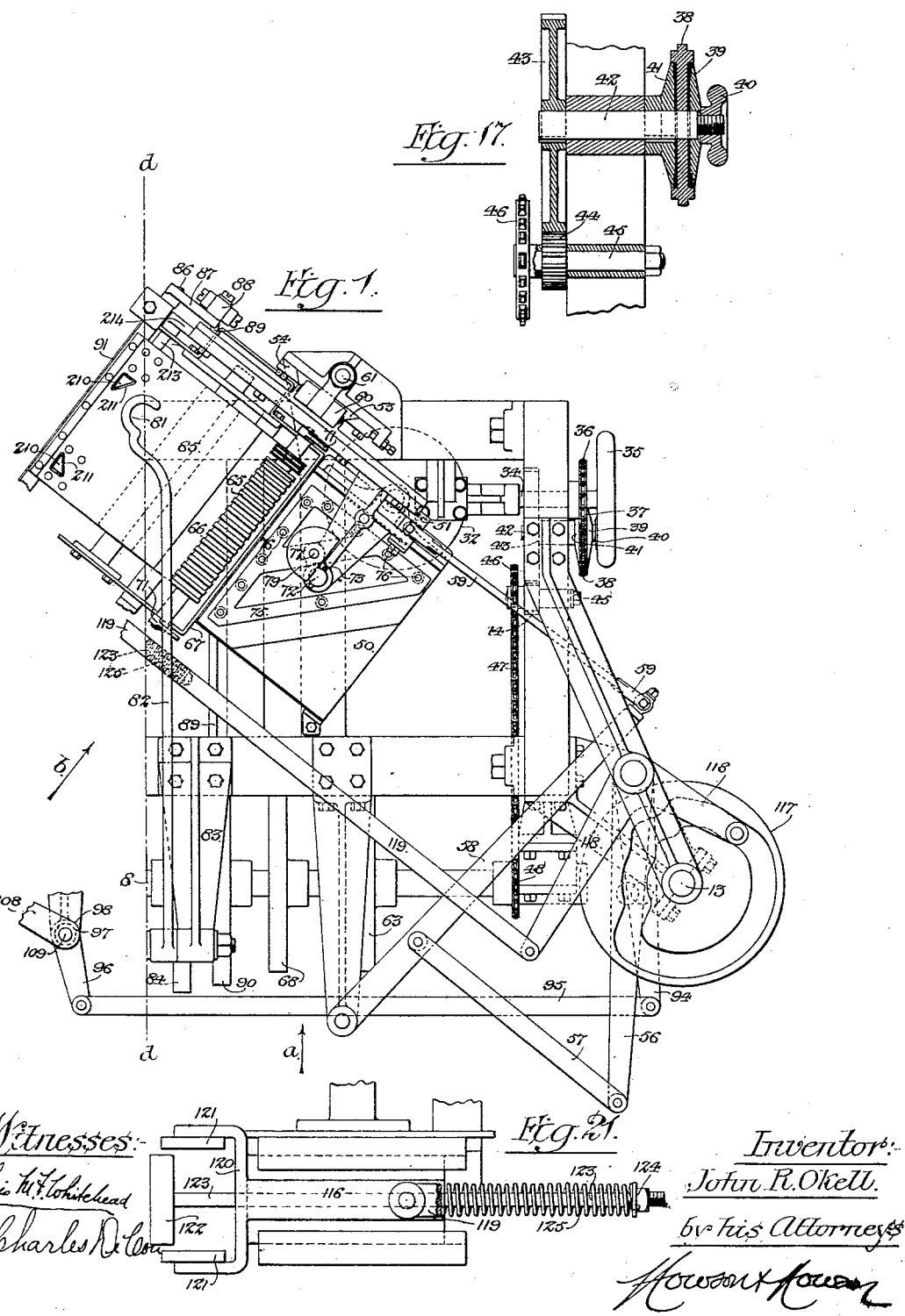

No. 655,574. Patented Aug. 7, 1900.
J. R. OKELL.
PACKAGE MAKING AND FILLING MACHINE.
(Application filed Oct. 8, 1899.)
(No Model.) 23 Sheets—Sheet 1.

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 2.

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 3.

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 4.

Witnesses:-
Inventor:-
John R. Okell.
by his Attorneys:-
Howson & Howson

No. 655,574. Patented Aug. 7, 1900.
J. R. OKELL.
PACKAGE MAKING AND FILLING MACHINE.
(Application filed Oct. 8, 1898.)

(No Model.) 23 Sheets—Sheet 5.

Witnesses:
Louis M. F. Whitehead
Charles H. De Leon

Inventor:
John R. Okell
by His Attorneys:
Howson & Howson

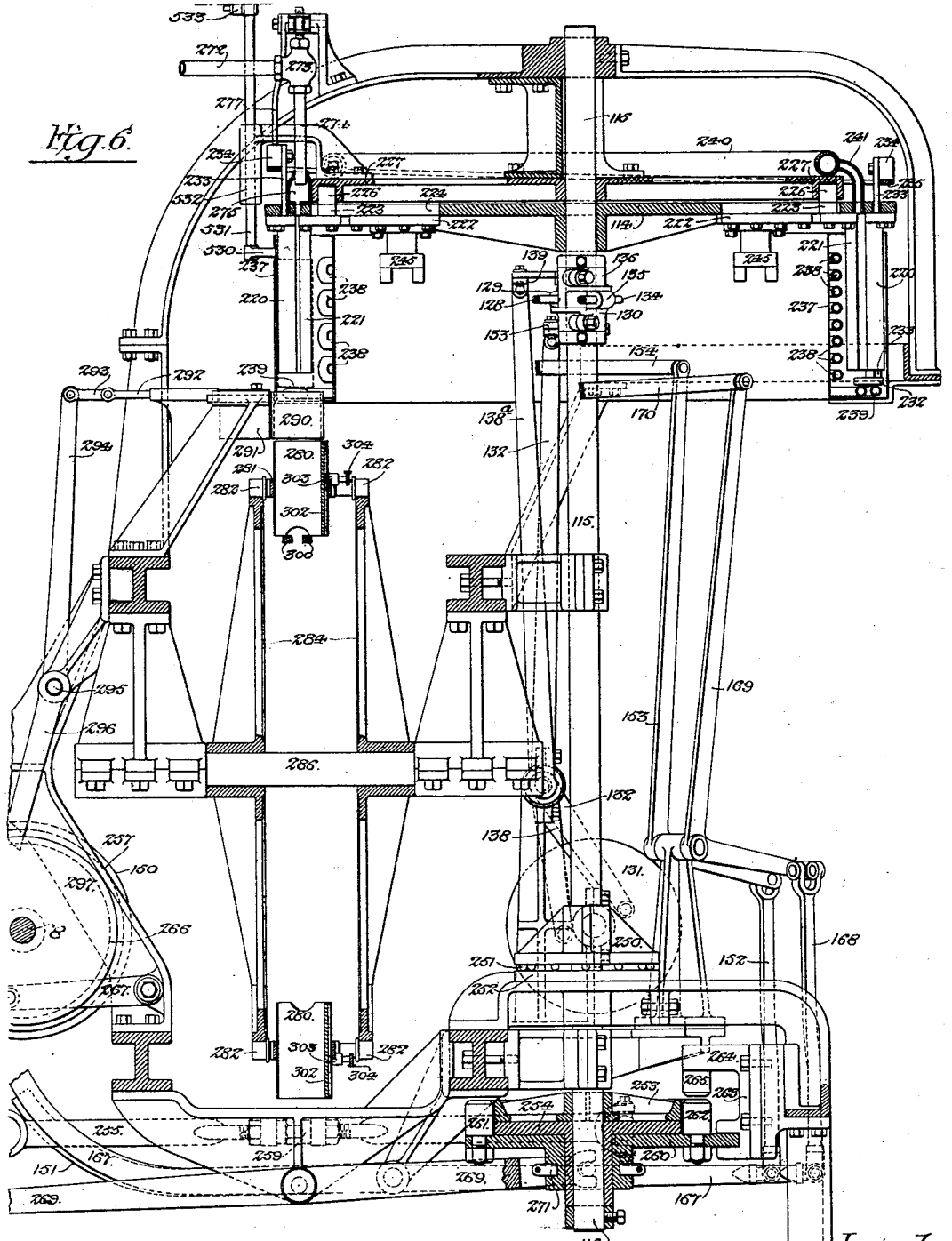

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 7.

Witnesses:
Louis H. F. Whitehead.
Charles DeLeon.

Inventor:-
John R. Okell.
by his Attorneys:
Howson & Howson

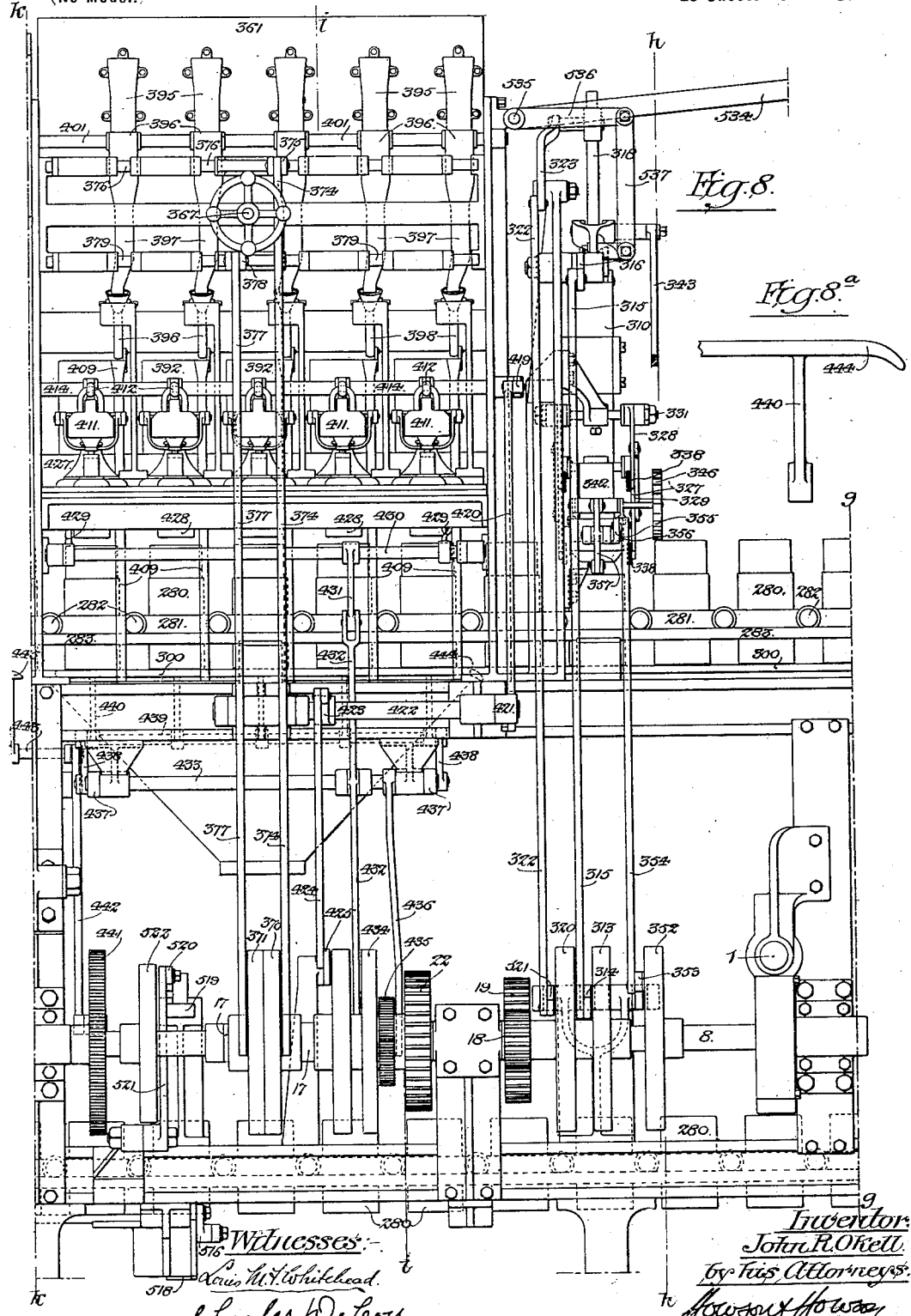

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 9.
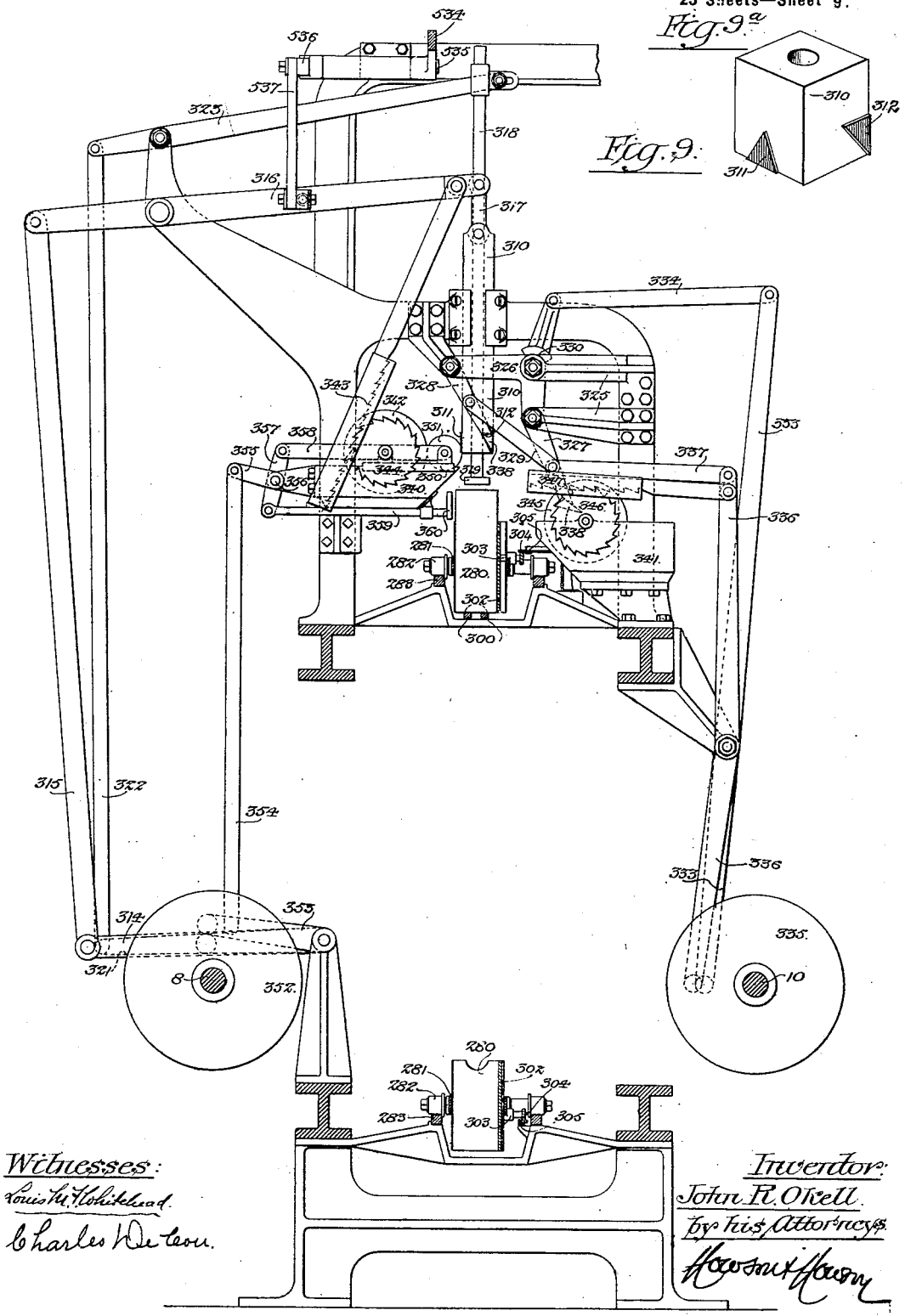
Witnesses:
Louis M. Whitehead.
Charles H. De Leon.
Inventor:
John R. Okell.
by his Attorneys No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 10.

Witnesses:—
Louis M. F. Whitehead.
Charles De Cou.

Inventor:—
John R. Okell.
by his Attorneys:—
Howsart Howson

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 11.
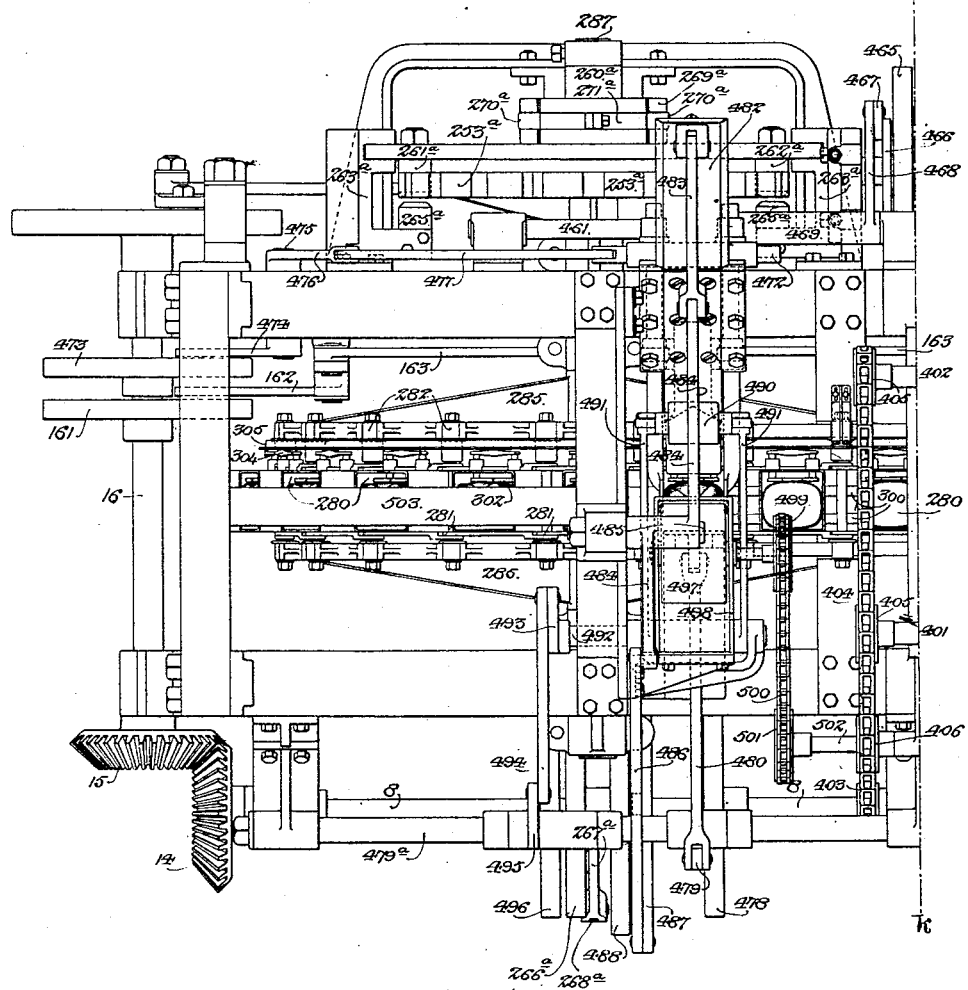
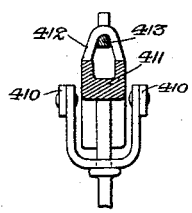
Witnesses:—
Louis M. F. Whitehead.
Charles De Leon.
Inventor:—
John R. Okell.
by his Attorneys:
Howson & Howson No. 655,574. Patented Aug. 7, 1900.
J. R. OKELL.
PACKAGE MAKING AND FILLING MACHINE.
(Application filed Oct. 8, 1898.)

(No Model.) 23 Sheets—Sheet 12.

Witnesses:—

Inventor
John R. Okell
by his Attorneys
Howson & Howson

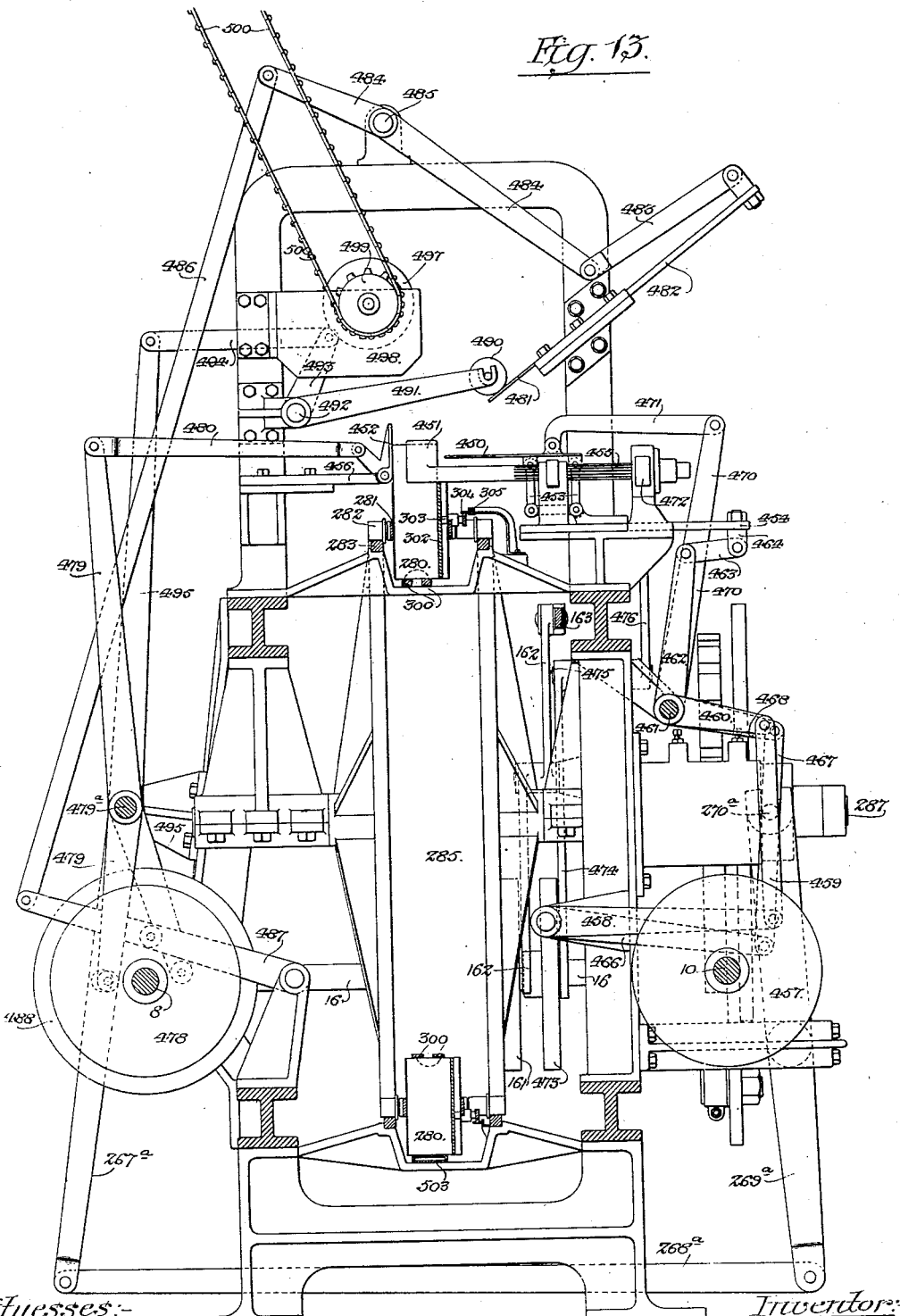

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 14.
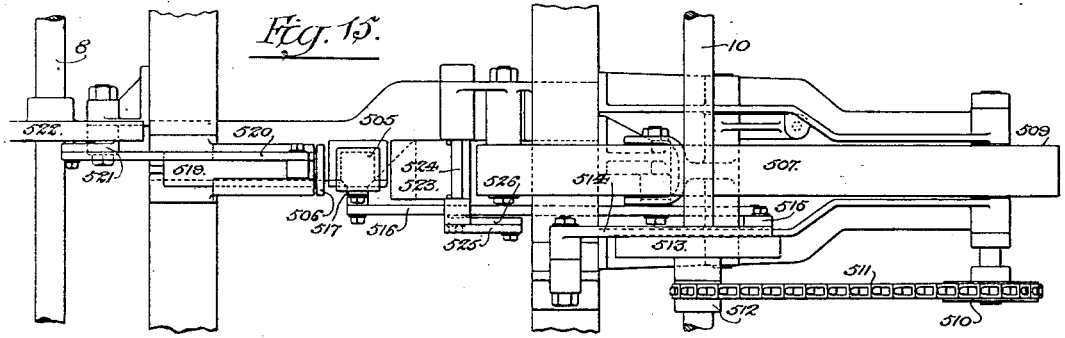
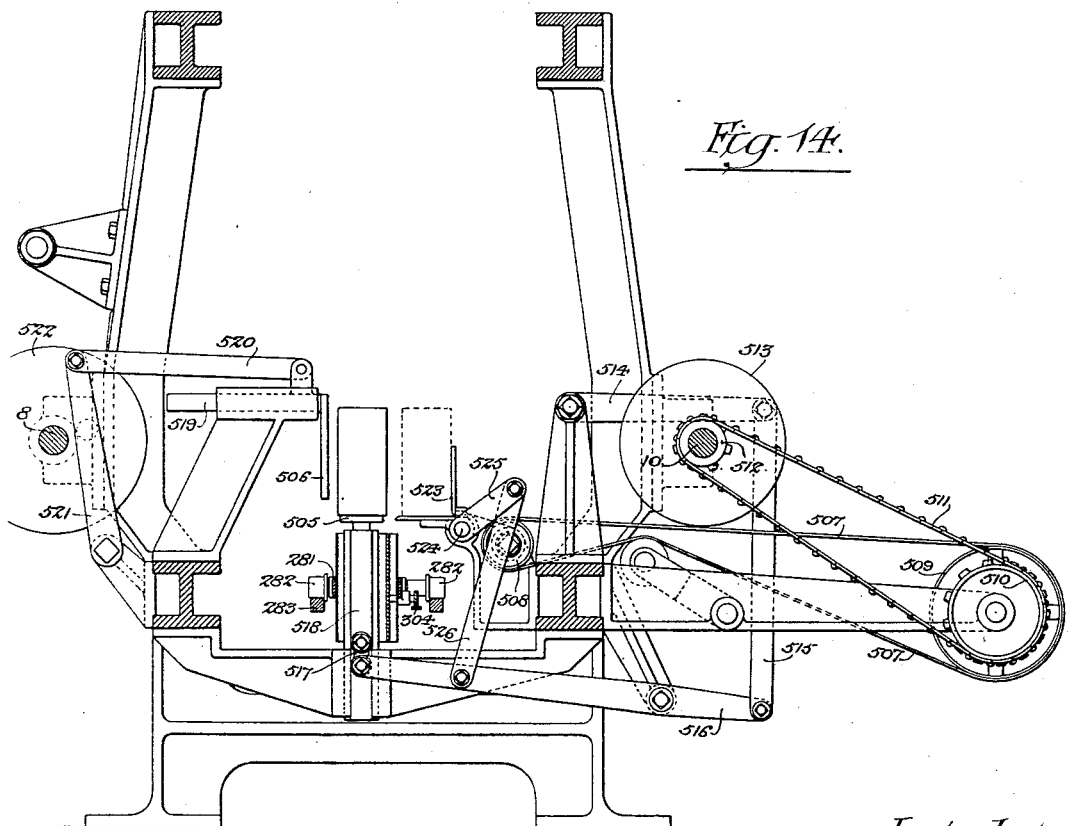
Witnesses:— Inventor:—
John R. Okell.
by his Attorneys

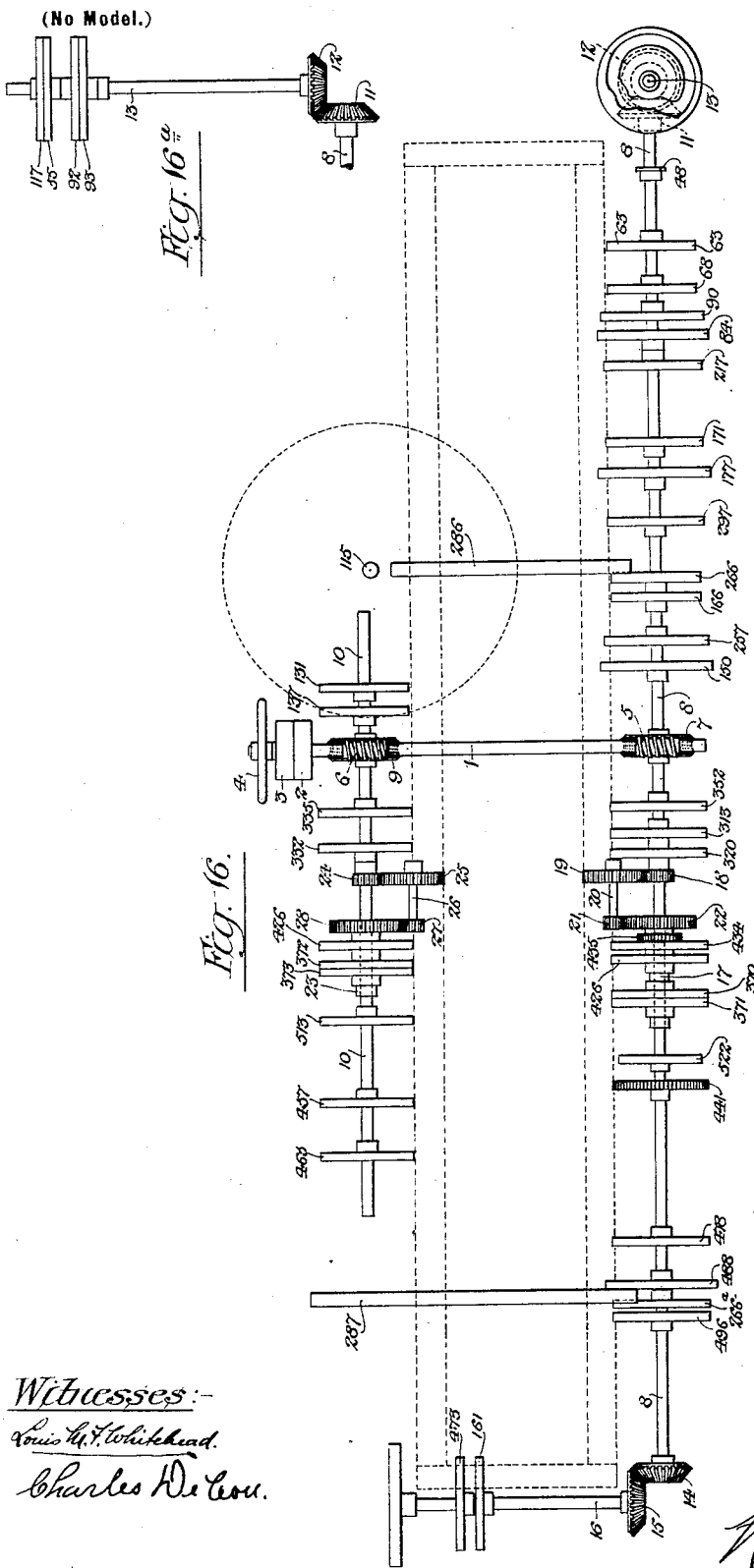

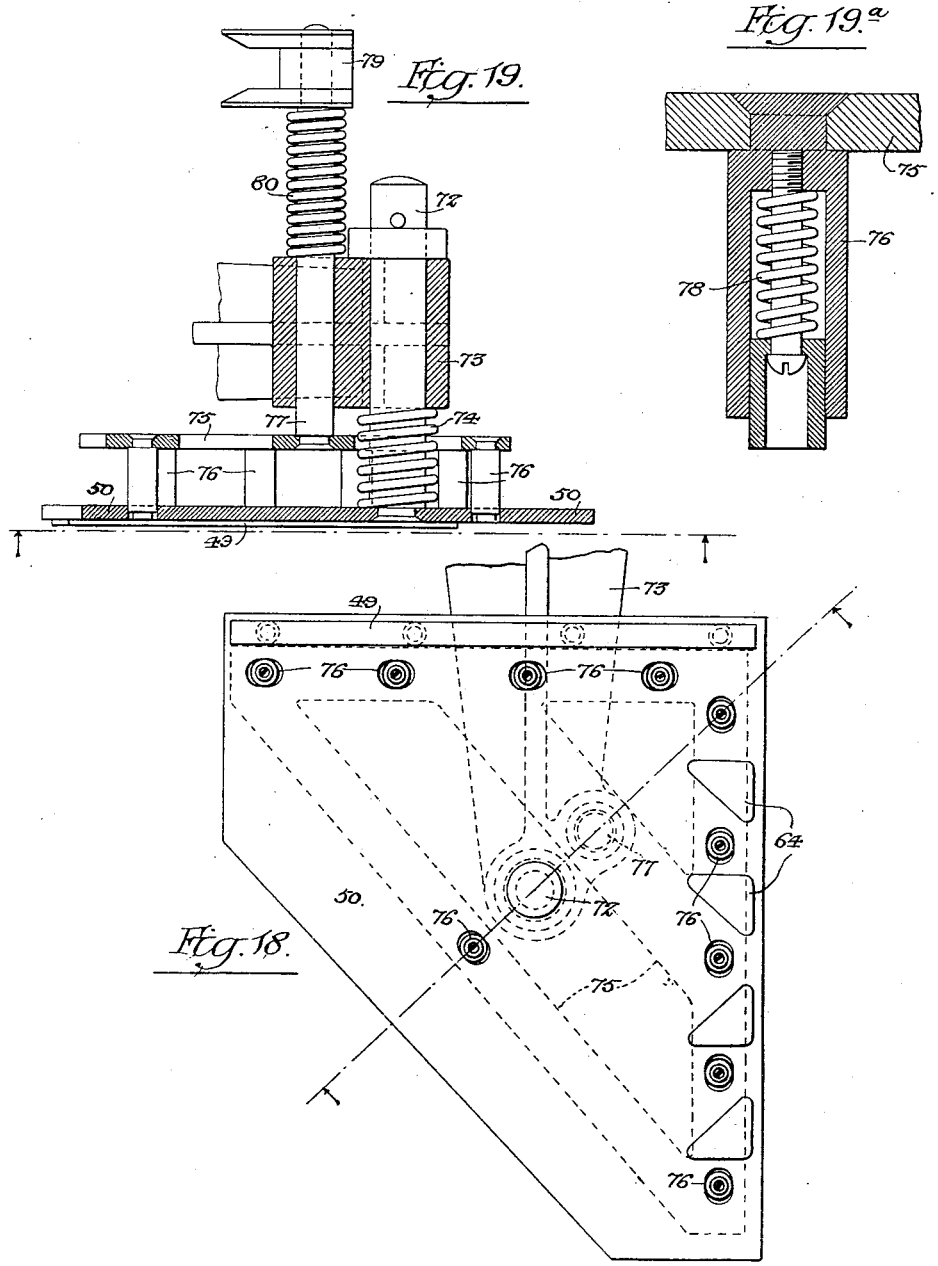

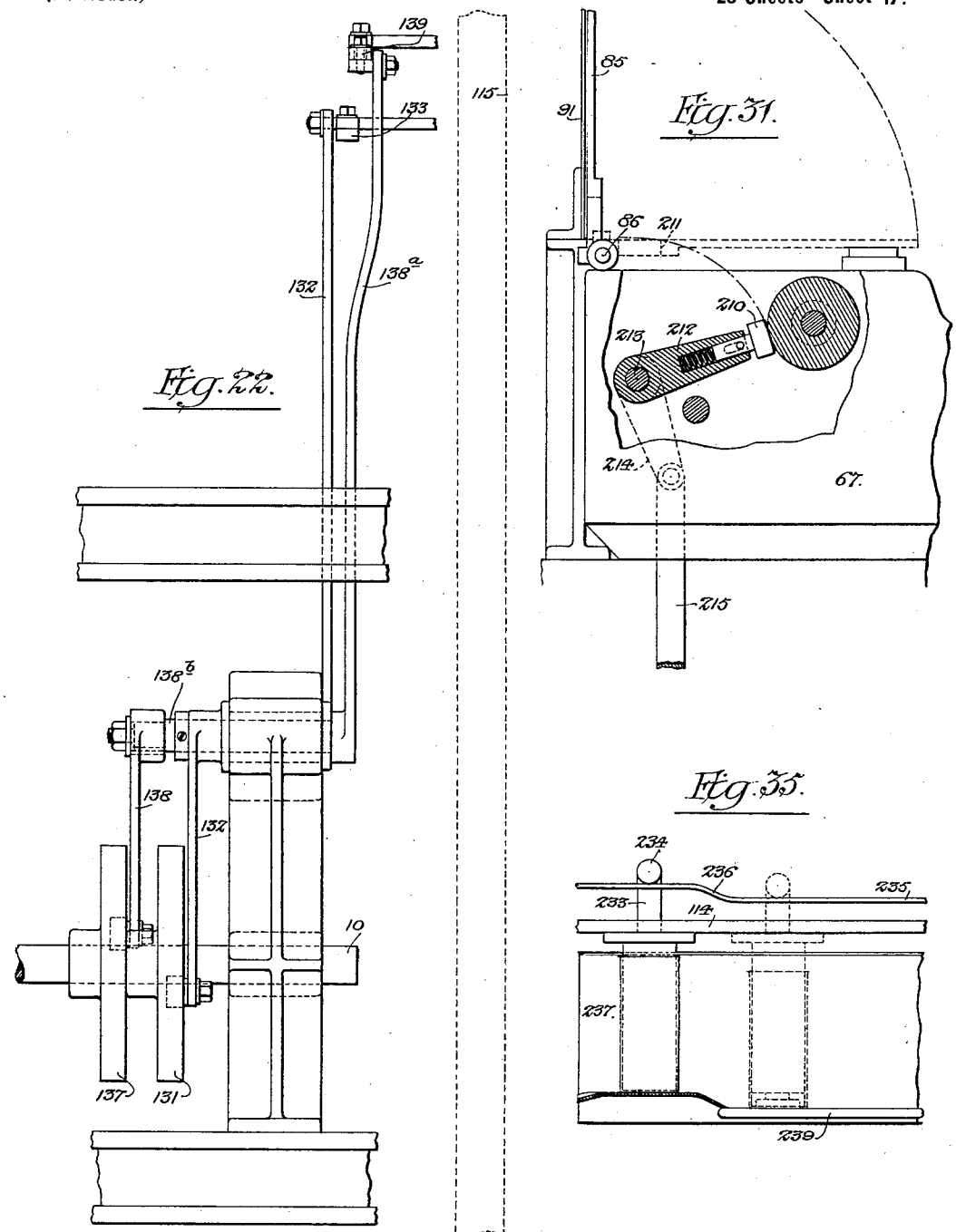

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 18.
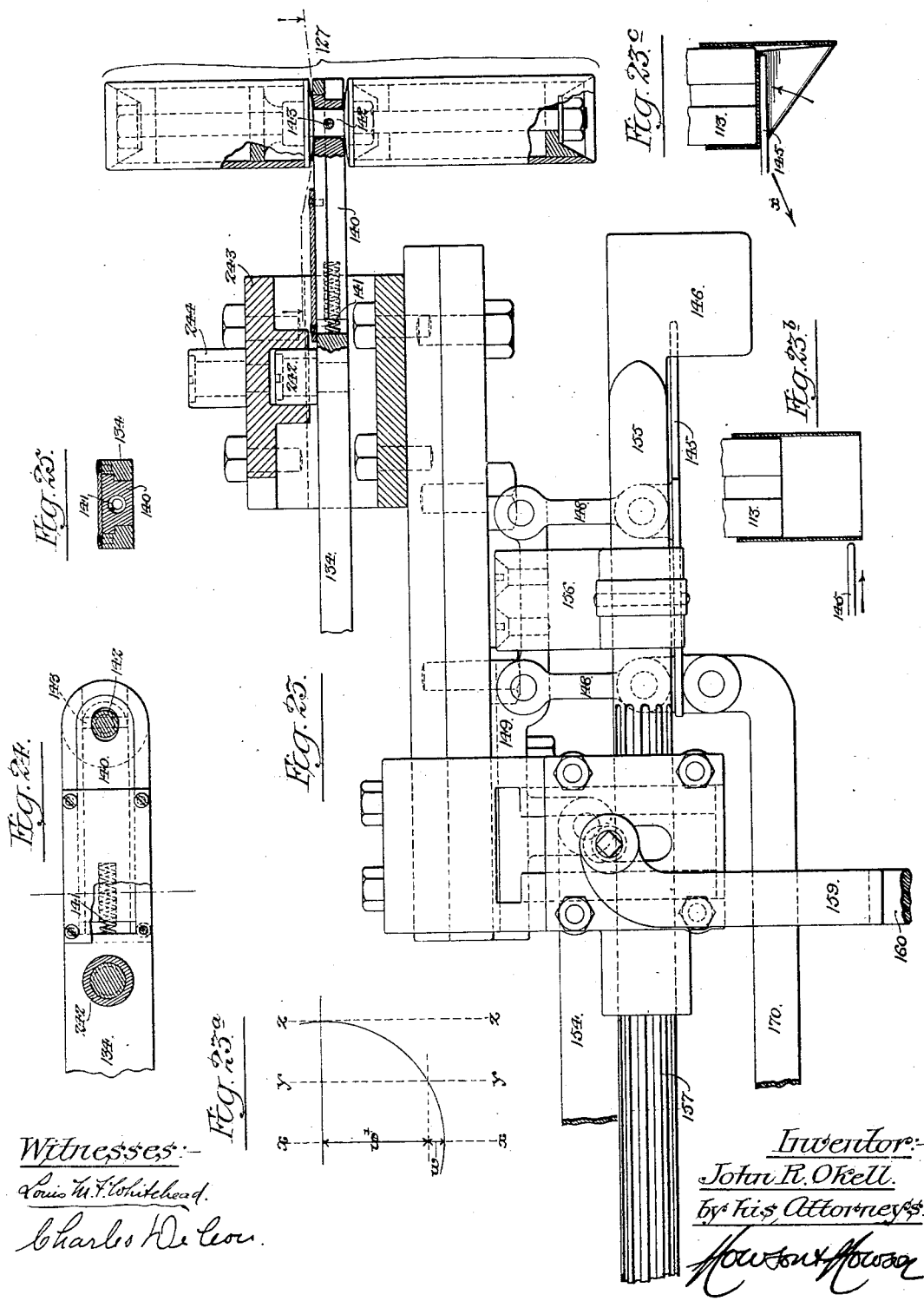
Witnesses:
Louis M. F. Whitehead.
Charles De Leon.
Inventor:
John R. Okell.
by his Attorneys
Howson & Howson No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 19.
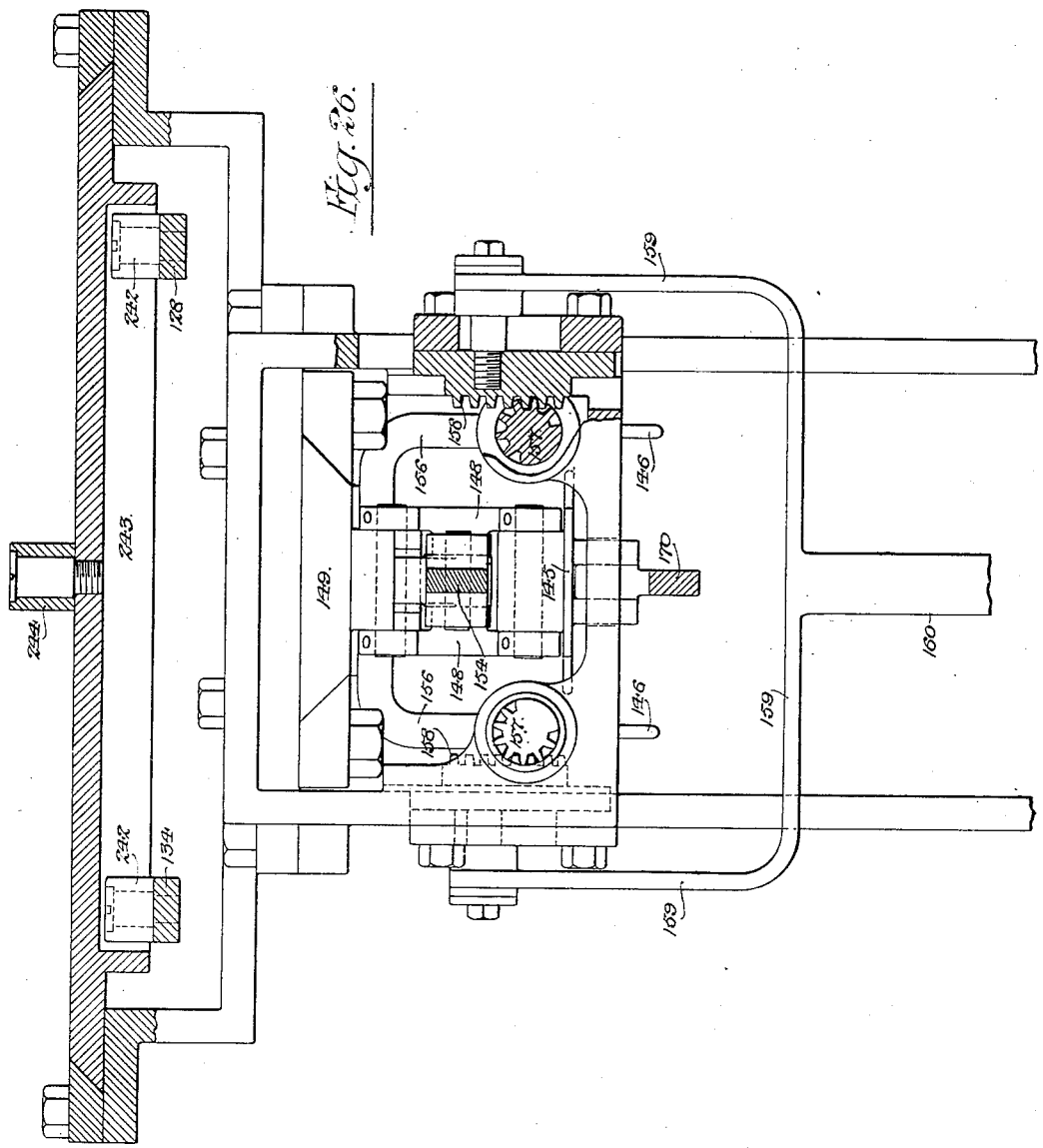
Witnesses:—
Louis M. F. Whitehead.
Charles De Cou.
Inventor:—
John R. Okell.
by his Attorneys.
Howson & Howson No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 20.

Witnesses:
Louis M. Whitehead.
Charles W. Cox.

Inventor:
John R. Okell.
by
His Attorneys:
Howson & Howson

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 21.
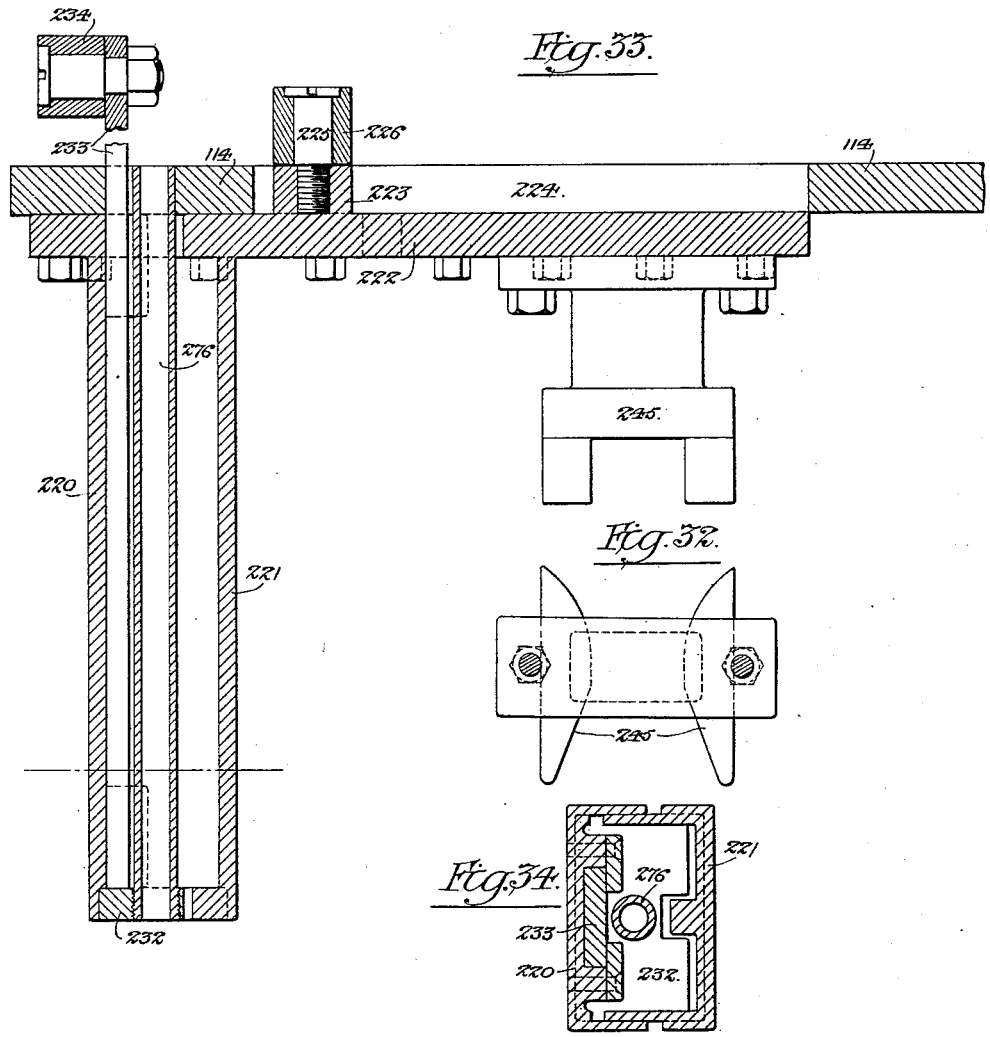

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 22.
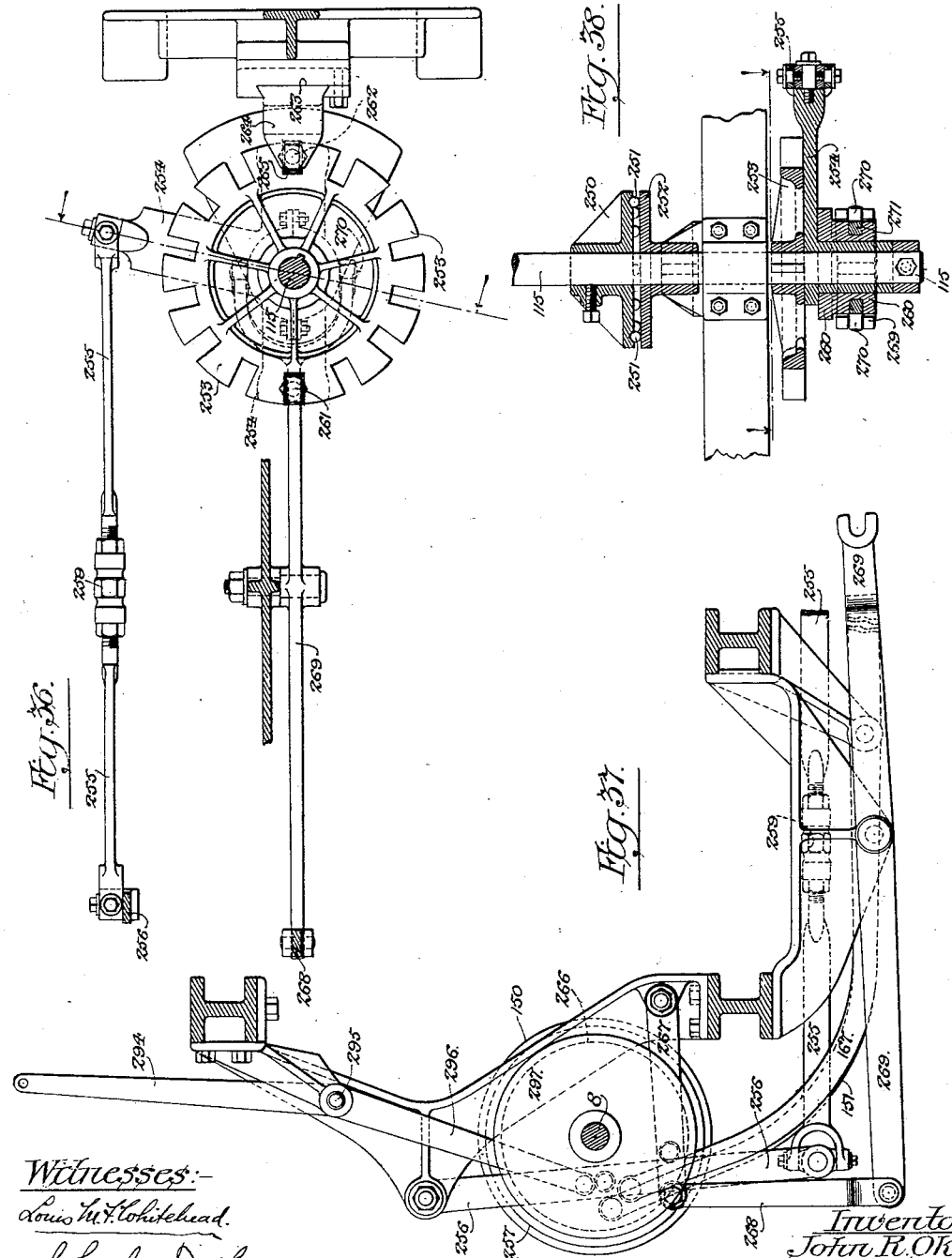

No. 655,574. Patented Aug. 7, 1900.
J. R. OKELL.
PACKAGE MAKING AND FILLING MACHINE.
(Application filed Oct. 8, 1898.)
(No Model.) 23 Sheets—Sheet 23.
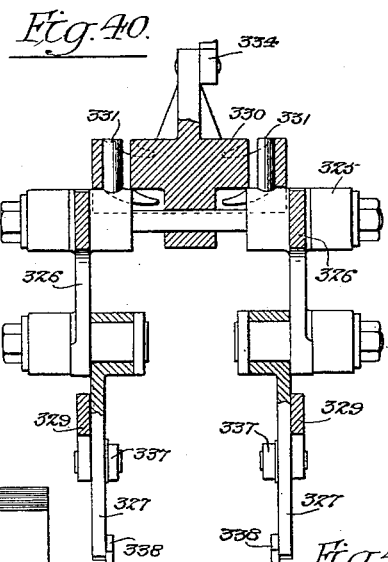
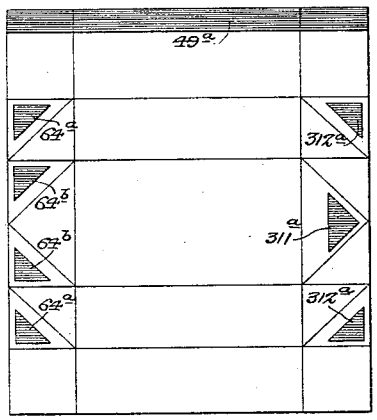
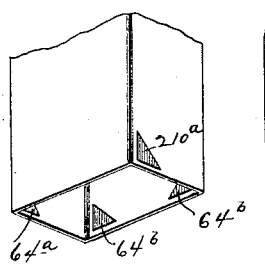
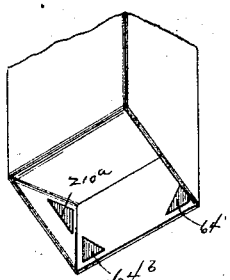
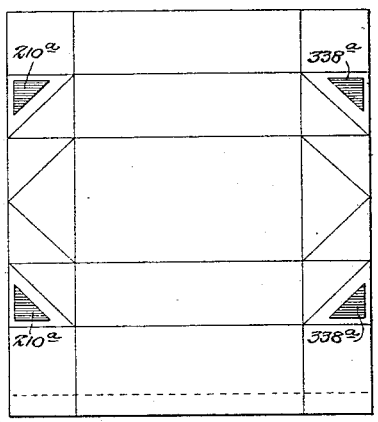
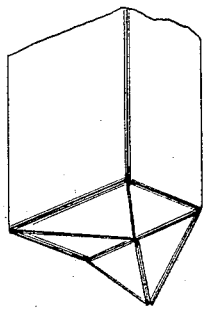
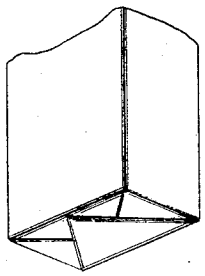
Witnesses:—
Louis M. F. Whitehead.
M. D. Miller.
Inventor:—
John R. Okell.
by his Attorneys:—
Howson & Howson

UNITED STATES PATENT OFFICE.

JOHN R. OKELL, OF PHILADELPHIA, PENNSYLVANIA.

PACKAGE MAKING AND FILLING MACHINE.

SPECIFICATION forming part of Letters Patent No. 655,574, dated August 7, 1900.

Application filed October 8, 1898. Serial No. 693,063. (No model.)

*To all whom it may concern:*

Be it known that I, JOHN R. OKELL, a citizen of the United States, residing in Philadelphia, Pennsylvania, have invented certain Improvements in Machines for Packaging Powdered or Granular Materials, of which the following is a specification.

The object of my invention is to provide an automatic machine of large capacity, whereby packages may be formed, filled with predetermined quantities of powdered or granular material, closed, and sealed, the invention comprising constructions and combinations of parts, all as fully hereinafter set forth and claimed.

Figure 2:
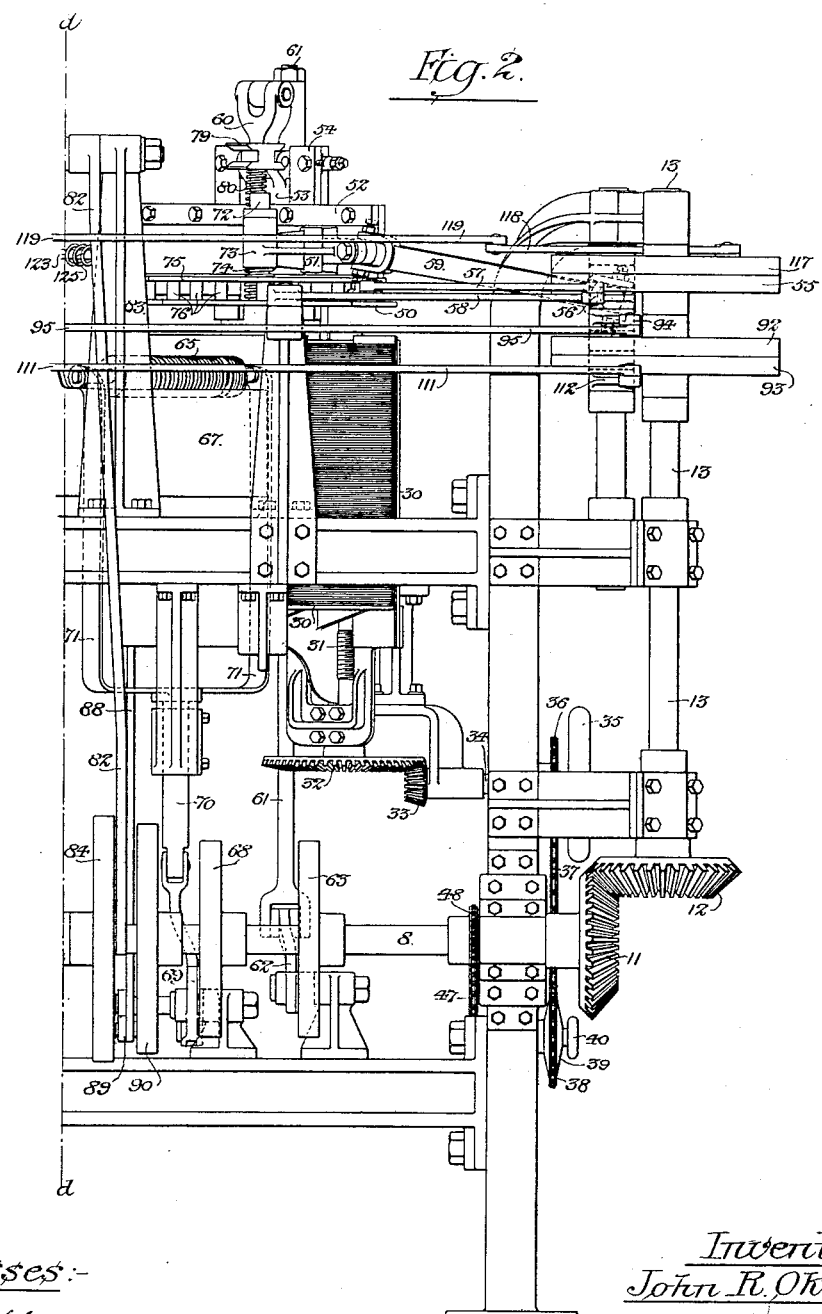
Figure 3:
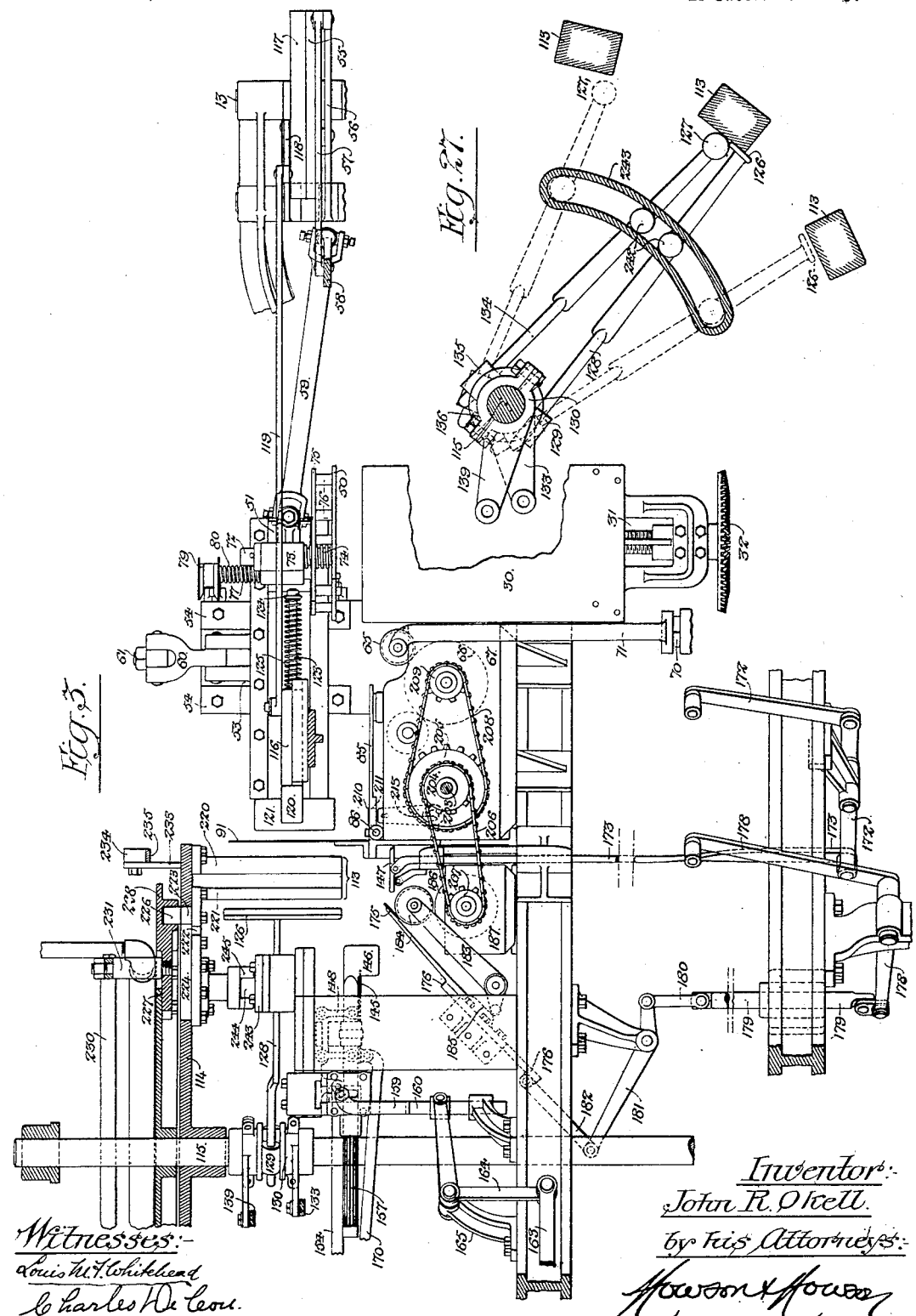
Figures 4, 30:
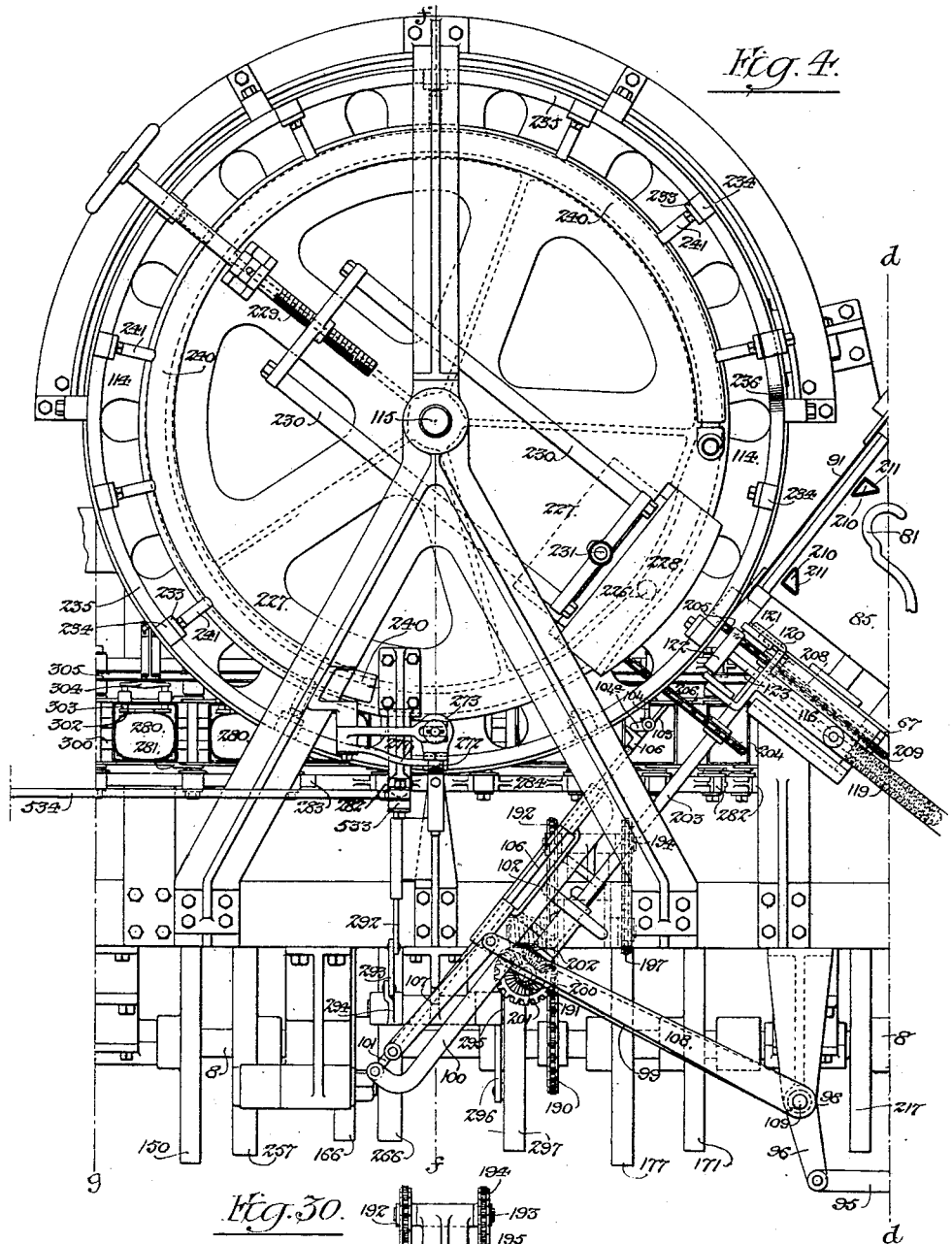
Figures 5, 30:
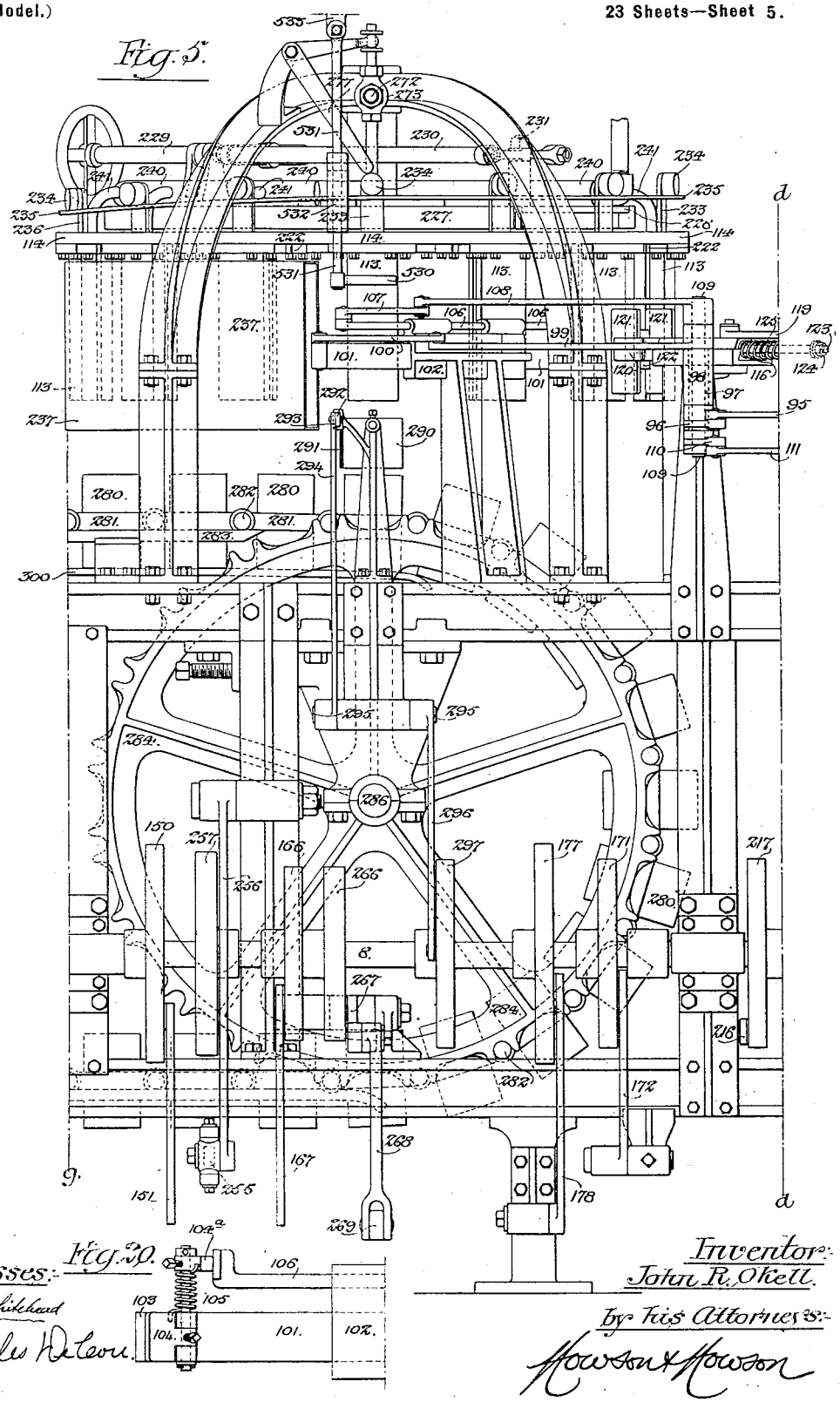
Figures 7, 7A:
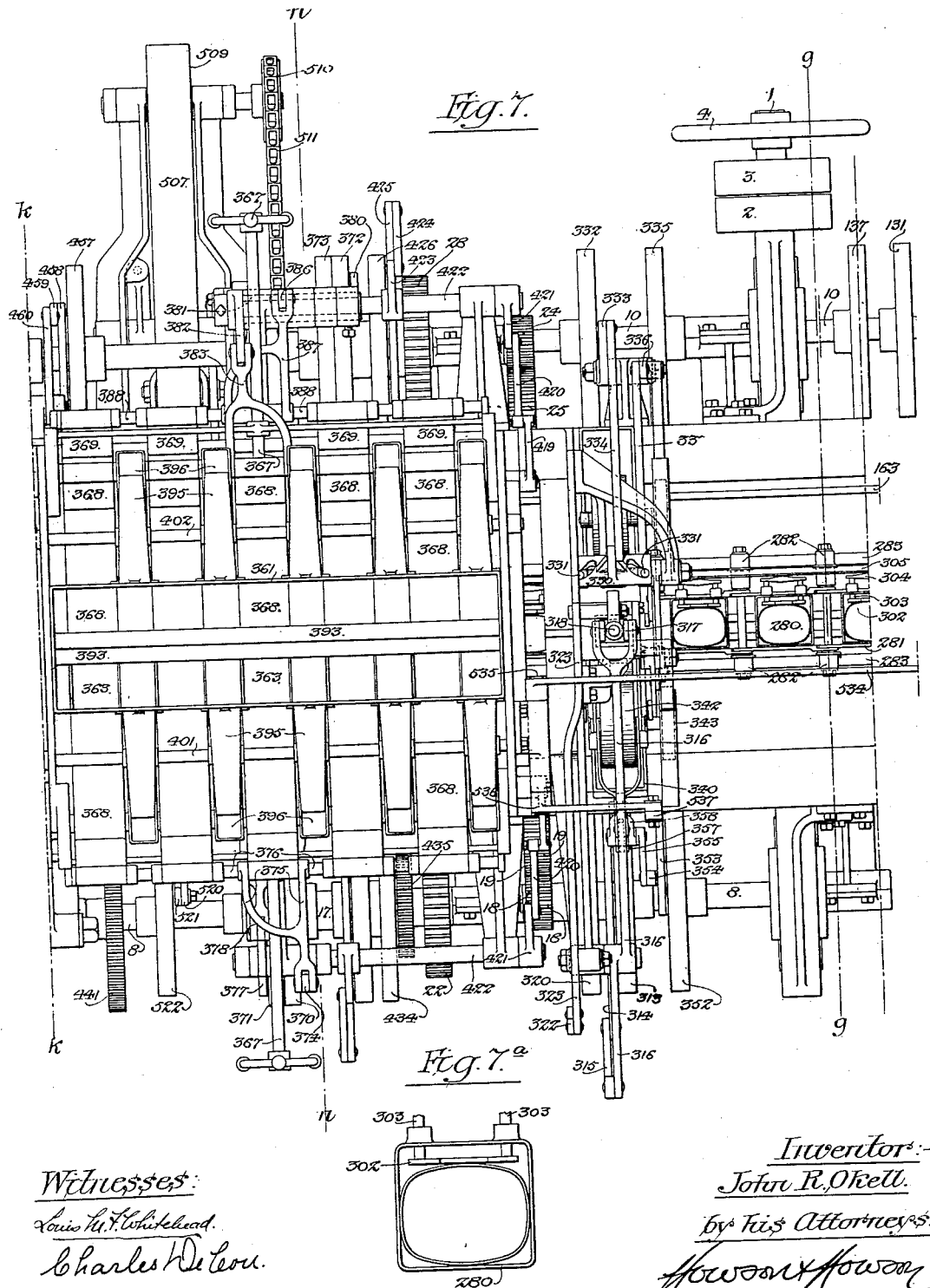
Figure 10:
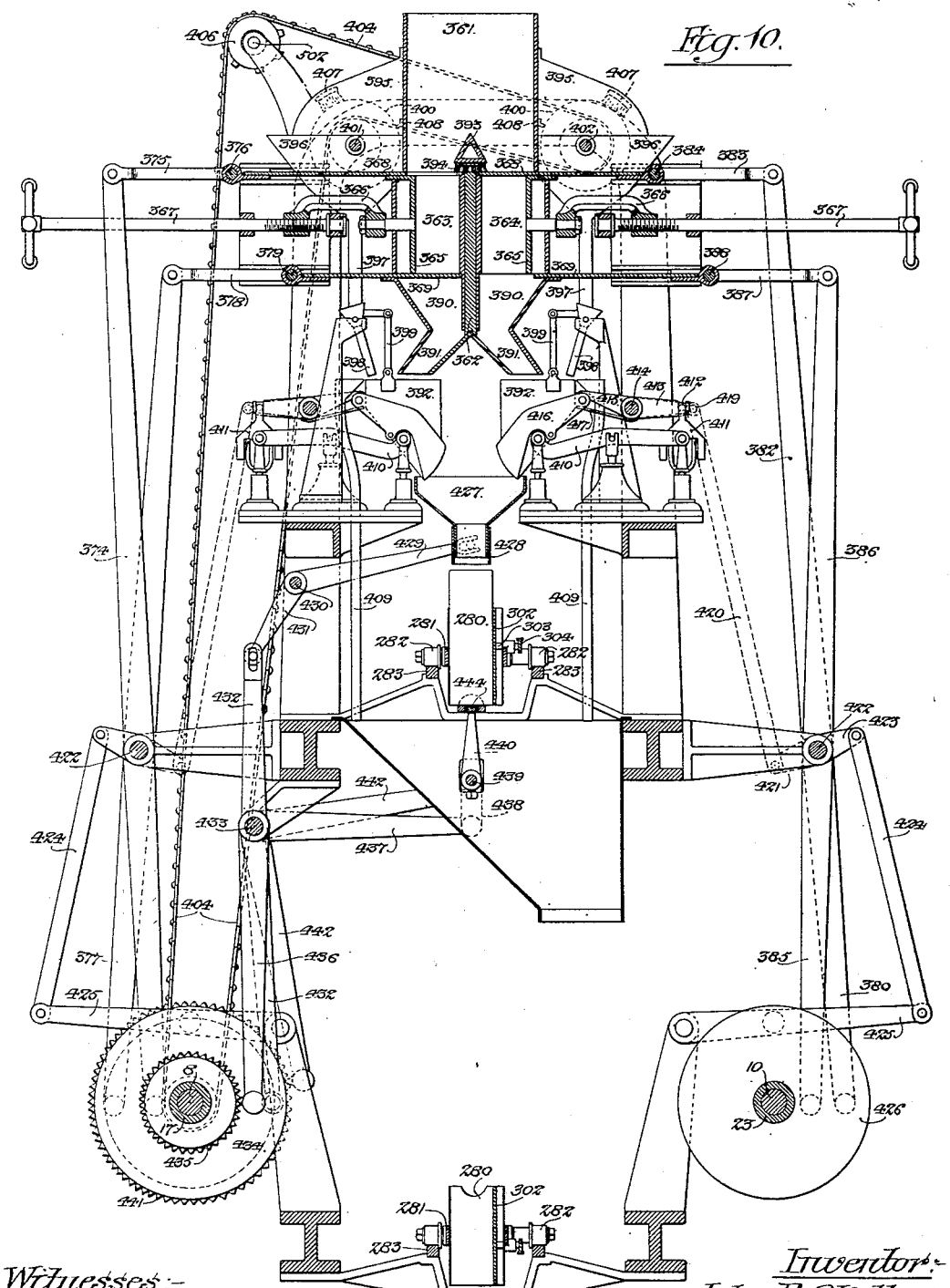
Figure 59:
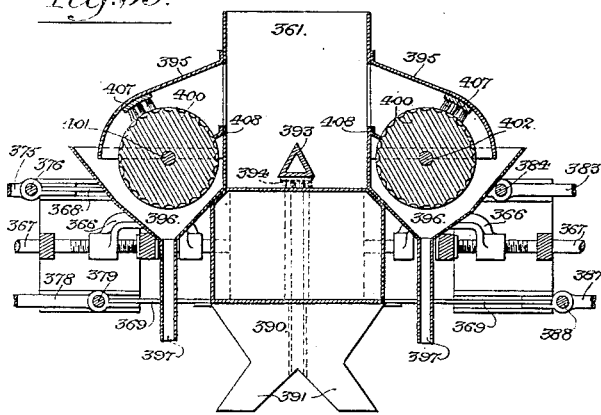
Figure 12:
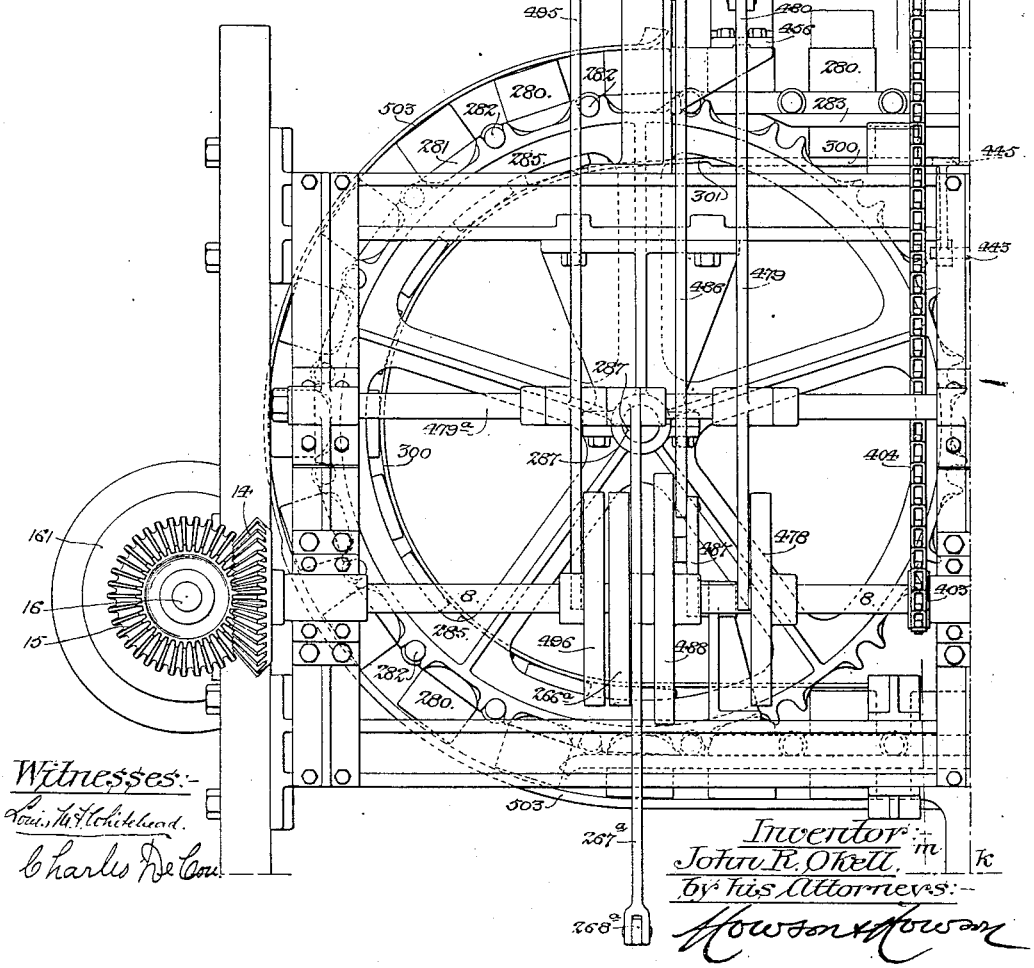

In the accompanying drawings, Figure 1 is a plan view of one end of the machine, illustrating the mechanism for supporting, pasting, and feeding successive sheets of paper into position to be formed into bags. Fig. 2 is a view of the mechanism shown in Fig. 1 looking in the direction of the arrow $a$ shown in said figure. Fig. 3 is a view of the mechanism shown in Fig. 1 and also of part of the adjoining mechanism of the machine looking in the direction of the arrow $b$, Fig. 1. Fig. 4 is a plan view of that part of the machine which adjoins the portion shown in Fig. 1, the line of separation being represented at $d\,d$. Fig. 5 is a side view of the mechanism shown in Fig. 4. Fig. 6 is a transverse section on the line $f\,f$, Fig. 4, with some of the parts omitted to avoid confusion. Fig. 7 is a plan view of the mechanism adjoining that shown in Fig. 4, the line of separation being that represented at $g\,g$ and a portion of the upper structure of the machine being removed in order to show the parts beneath. Fig. 8 is a side view of the mechanism shown in Fig. 7. Fig. 9 is a transverse section on the line $h\,h$, Fig. 8, with parts in the distance omitted. Fig. 10 is a transverse section on the line $i\,i$, Fig. 8, likewise omitting distant parts. Fig. 11 is a plan view of that portion of the machine adjoining Fig. 7, the line of separation being represented at $k\,k$. Fig. 12 is a side view of the mechanism shown in Fig. 11. Fig. 13 is a transverse section on the line $m\,m$, Fig. 12. Fig. 14 is a transverse section on the line $n\,n$, Fig. 7, illustrating the mechanism for discharging the filled bags. Fig. 15 is a plan view of the same. Figs. 16 and 16$^a$ are diagrammatic views illustrating the main shafts, cams, and driving-gears of the machine. Figs. 17 to 40 and Figs. 7$^a$, 8$^a$, 9$^a$, 10$^a$, 19$^a$, 23$^a$, 23$^b$, and 23$^c$ are detached views, mostly on an enlarged scale and intended to illustrate features of construction not shown with sufficient clearness in the general views. Figs. 41 and 42 are views of the opposite sides of the sheet of paper of which the bag or package is composed, showing the points at which paste is applied thereto; and Figs. 43, 44, 45, and 46 are perspective views illustrating the successive folds whereby the bottom or top of the bag is closed.

I will first describe the general driving mechanism of the machine with reference to the diagrams Figs. 16 and 16$^a$ and will afterward specifically describe the various parts of the machine and the means whereby the same are operated from said main driving mechanism.

The fixed framework of the machine has bearings for a transverse shaft 1, which is the primary shaft, and has loose pulleys 2 and 3 and a hand-wheel 4, so that it can be turned either by hand or power, as desired. On this primary shaft 1 are two worms 5 and 6, the worm 5 engaging with a worm-wheel 7 on a longitudinal shaft 8 at one side of the machine, and the worm 6 engaging with a worm-wheel 9 on a longitudinal shaft 10 at the other side of the machine. The shaft 8 is geared at one end, by means of bevel-wheels 11 and 12, to a vertical shaft 13, and at its opposite end said shaft 8 is geared, by means of bevel-wheels 14 and 15, to a transverse shaft 16.

Mounted so as to turn freely on the shaft 8 is a sleeve 17, which is geared to the shaft 8, so as to rotate at one-fifth of the speed of the latter, the gearing comprising in the present instance a spur-pinion 18 on the shaft 8, which meshes with a spur-wheel 19 on a short shaft 20, mounted adjacent to said shaft 8, and having a spur-pinion 21, which meshes with a spur-wheel 22 on the sleeve 17. In like manner a sleeve 23 is mounted upon the shaft 10 and is geared to the latter, so as to rotate at one-fifth of the speed of the same, by means of a spur-pinion 24, spur-wheel 25, shaft 26, spur-pinion 27, and spur-wheel 28.

The sheets of paper from which the bags are to be made are mounted upon a vertically-guided platform 30, which can be raised and lowered by any of the devices ordinarily employed in paper-feeding machines. In the present instance I employ a screw-stem 31, which is adapted to a nut projecting from the paper-holder and is provided with a bevel-wheel 32, which meshes with a bevel-pinion 33 on a shaft 34, the latter having a hand-wheel 35, by which it may be manipulated when desired, and being also furnished with a sprocket-wheel 36, which receives a chain 37, running from a sprocket-wheel 38, which can be clamped by means of a movable friction-disk 39 and nut 40 to a disk 41, secured to a shaft 42, which turns in a bearing on the fixed frame of the machine, as shown in Fig. 17, said shaft 42 having a spur-wheel 43, meshing with a pinion 44, free to turn on a stud 45, projecting from the fixed frame, the hub of said pinion 44 having a sprocket-wheel 46, which receives a chain 47, running over a sprocket-wheel 48 on the shaft 8, as shown in Fig. 1, thus providing a means for operating the paper-holder by power, which at the same time does not interfere with the free manipulation of said paper-holder by hand, the sprocket-wheel 38 in the latter case slipping between the friction-disks 39 and 41.

Above the paper-holder 30 is a sheet-lifter 50, which is shown in enlarged inverted plan in Fig. 18 and in enlarged vertical section in Fig. 19, said lifter being mounted upon a slide 51, free to move horizontally in guides 52, which in turn are carried by a slide 53, free to move vertically in guides 54, the horizontal movement of the slide 51 being effected by means of a cam 55 on the vertical shaft 13, said cam acting upon an arm 56, which is hung to a bracket on the fixed frame and is connected by a rod 57 to an arm 58, the latter being connected by a gimbal-joint to one end of a rod 59, which is connected at its opposite end by means of a similar gimbal-joint to the slide 51. By the use of these gimbal-joints the slide 51 is permitted to move vertically and can also have the desired horizontal reciprocating motion imparted to it by the cam 55. The vertical slide 53 is connected by a link 60 to the upper end of a rod 61, the lower end of which is connected to a lever 62, which is vibrated by means of a cam 63 on the shaft 8. By this means a combined vertical and longitudinal reciprocation can be imparted to the sheet-lifter 50, whereby the latter can be caused to descend upon the top sheet of the pile mounted upon the holder 30 and can then be raised, carrying the sheet with it, and then moved forward, so as to deposit the sheet at the proper place, and after the sheet has been discharged can be moved backward prior to a repetition of this operation. The sheet-lifter 50 has on the under side suitable projections 49 and 64 for receiving paste from a roller 65, these pasted projections causing the sheet to adhere to the lifter and be carried forward by the same, and also serving to apply paste to the sheet at 49ª, Fig. 41, in proper position for forming the side seam of the bag and at 64ª and 64ᵇ, Fig. 41, in proper positions for securing together the preliminary folds of the bag-bottom, as described hereinafter. When the sheet-lifter, with the sheet adhering thereto, moves forward, the roller 65 is depressed, as shown in Fig. 3, so as to run in contact with the paste-distributing roller 66 in a paste-box 67; but when after the discharge of a sheet therefrom the sheet-lifter returns to its primary position the roller 65 is raised, so as to come into contact with the projections 49 and 64 on the under side of the sheet-lifter and properly apply the paste to said projections. This rising-and-falling movement of the paste-roller 65 is effected by means of a cam 68 on the shaft 8, said cam acting upon a lever 69, which is connected to a guided rod 70, the latter terminating in a yoke 71, which carries the journals of the pasting-roller 65, as shown in Figs. 2 and 3. The sheet-lifter 50 has a stem 72, which is guided in a bracket 73 on the slide 51, a spring 74 being interposed between the back of the lifter and the under side of the bracket, as shown in Figs. 2 and 19, so that the lifter can yield upwardly when it is pressed into contact with the top sheet of the pile of paper, and in order to release the sheet from the lifter when the same has been carried forward to the proper position I use a push-off plate 75, having a number of projecting pins 76, which are adapted to pass through openings in the lifter and when pressed downward serve to push the sheet of paper out of contact with the pasted projections on the under side of said lifter. On reference to Fig. 19 it will be observed that the push-off plate 75 is carried by a rod 77, which is guided in the bracket 73, said rod 77 having at the upper end a slotted head 79, between which and the bracket 73 is interposed a spring 80, which tends to lift the push-off plate 75, and thereby retract the pins 76, so that they do not project beyond the lower face of the sheet-lifter 50. The pins 76 are also provided with spring-backings, as shown at 78 in Fig. 19ª, so that they are at liberty to yield upwardly when subjected to pressure greater than the tension of the springs. When the sheet-lifter is moved forward, however, the slotted head 79 is brought into engagement with the hooked end 81 of the bell-crank lever 82, which is hung to a bracket 83 on the fixed frame and is acted upon by a cam 84 on the shaft 8, as shown in Figs. 1 and 2, so that a quick vibrating movement will be imparted to the said lever 82 when the slotted head 79 has been brought into engagement with the hooked end of the same, thereby imparting a quick downward movement to the push-off plate 75, so as to press the sheet of paper downwardly away from the lifter 50. The sheet of paper is pressed downward by the pins 76 onto a tilting plate 85, secured to a rock-shaft 86, which has at one end an arm 87, and to the latter is connected, by means of a gimbal-joint, the upper end of a rod 88, having at its lower end a similar gimbal-joint, whereby it is connected to a lever 89, which is acted upon by a cam 90 on the shaft 8, whereby rocking movement is at the proper time imparted to the plate 85, so that the pasted sheet of paper lying thereon will be turned from a horizontal to a vertical position, undue forward movement being prevented by means of a vertical plate 91, as shown in Fig. 3. After having thus been moved to the vertical position the sheet of paper is withdrawn laterally, so that it can be folded around the bag-mold, the mechanism for accomplishing this purpose being shown in Figs. 1, 2, 4, 5, and 20, and being as follows: On the vertical shaft 13 are two cams 92 and 93, the cam 92 acting upon an arm 94, which is connected by a rod 95 to an arm 96 on a sleeve 97, which is free to turn in a bearing on the bracket 98 on the fixed frame, said sleeve carrying at its upper end an arm 99, which is connected by means of a link 100 to the outer end of a sliding bar 101, Figs. 4 and 5, said bar being guided in a fixed yoke 102 and having at its inner end the fixed jaw 103 of a pair of nippers, the other or movable jaw 104 of said nippers being secured to a rock-shaft which can turn in bearings on said fixed jaw 103 and carries an arm $104^a$, which is acted upon by a spring 105, tending to open the jaws of the nippers, said jaws being closed by the action upon said arm $104^a$ of the head of a rod 106, which is likewise guided in bearings in the yoke 102 and is connected by a link 107 to an arm 108 upon a vertical rod 109, which passes through the sleeve 97 and has at its lower end an arm 110, which is connected by a rod 111 to an arm 112, actuated by the cam 93. When the sheet of paper is turned into the vertical position by means of the tilting plate 85, it projects somewhat beyond the plate 91, and by means of the mechanism described the nippers are caused to advance and close upon this projecting edge of the sheet of paper, and are then retracted so as to draw the sheet of paper laterally until it occupies the desired relation in respect to a bag mold or former 113, depending from a mold-wheel 114, which is secured to a vertical shaft 115, to which intermittent movements of partial rotation are imparted by means of mechanism to be hereinafter described, said mold-wheel carrying a number of depending molds, which are thereby brought successively into position in line with certain bag-folding devices, which act upon the successive sheets of paper drawn laterally from the sheet-feeding devices by means of the traveling nippers which I have just described, these bag-folding devices serving to fold the sheet of paper around three sides of the mold preparatory to the formation of the tube by the folding in and overlapping of the edges of said sheet on the fourth side of the mold.

The preliminary folding devices consist of a slide 116, mounted in suitable guides on the fixed frame and having a reciprocating movement imparted to it by a cam 117 on the shaft 113, said cam 117 acting upon a bell-crank lever 118, which is connected to the slide 116 by means of a rod 119. The forward end of the slide 116 terminates in a yoke 120, as shown in Figs. 4 and 21, and each of the legs of this yoke carries a side-folder plate 121, between which is free to play a presser-plate 122, carried by a rod 123, which passes through an opening in the slide 116 and has at the rear end a collar 124, between which and the rear end of the slide is interposed a spring 125, this spring being connected at its opposite ends to the slide and collar and serving to project the presser-plate 122, so that its forward face normally occupies a plane in advance of the forward ends of the side presser-plates 121, as shown in Figs. 4 and 21. When, therefore, the slide 116 is moved forward, the first effect of this movement is to bring the forward face of the plate 122 into contact with the sheet of paper which has been drawn laterally by the nippers, thereby pressing the central portion of said sheet of paper against the adjacent face of the mold 113, which is in position to receive it. The forward movement of the presser-plate 122 is thereby arrested, but the side presser-plates continue to move forward, and, the nippers having meantime released their hold upon the sheet of paper, the opposite end portions of said sheet are bent around the sides of the mold.

In order to complete the tube, it is now necessary to bend in and overlap on the fourth side of the mold the edges of the sheet of paper which project inwardly beyond said fourth side, and this is accomplished by the mechanism shown in Figs. 3 and 6 and in Figs. 22 to 27. The lappers consist of a plate 126 and a roller 127, the plate 126 being carried by a rod 128, which is free to move longitudinally in a boss 129 on the hub 130, mounted so as to be free to swing upon the vertical shaft 115 of the mold-wheel, this hub having vibrating movement imparted to it at proper intervals by means of a cam 131 on the shaft 10, said cam acting through the medium of a lever 132 and connecting-rod 133, the latter being attached to an arm on the hub 130. (See Figs. 3 and 22.) In like manner the lapping-roller 127 is carried by an arm 134, which is free to play in a boss 135 upon the hub 136, mounted above the hub 130, and like it free to swing on the vertical shaft 115, swinging movement at the proper time being imparted to the said hub 136 by means of a cam 137 on the shaft 10, which cam acts upon an arm 138, secured to a rock-shaft $138^b$, which passes through the hollow hub of the lever 132, as shown in Fig. 22, and has another arm $138^a$, connected to an arm on the hub 136 by means of a rod 139. By this means the lapper-plate 126 first folds in one of the projecting edges of the sheet of paper on the inner side of the mold, and the lapping-roller 127 then folds the other edge so as to cause it to overlap that previously folded and press it down upon the same, the overlapping portion having had paste applied to it, as shown at 49ª, Fig. 40, by the projection 49 upon the under side of the sheet-lifter, so that the overlapping edges will be confined together and a tube will be thereby formed upon the mold 113. The roller 127 is mounted upon the end of the arm 134, so as to be capable of longitudinal movement in respect thereto, said roller being mounted upon a slide 140, which is adapted to guides at the end of the arm 134 and is acted upon by a spring 141, as shown in Figs. 23 and 24, so that it is capable of yielding backwardly if it happens to strike the corner of the mold. The roller 127 is also pivotally mounted upon the slide 140, said roller being composed of upper and lower sections connected together by a rod 142, which passes through an opening in the end of the slide 140 and is hung thereto by means of a pin 143, the opening being countersunk to permit a slight play of the rod therein and the ends of the upper and lower sections of the roller 127, which adjoin the upper and lower sides of the slide 140, being rounded or convex, as shown in Fig. 23, so as to permit of this movement. By reason of this construction proper bearing of the roller upon a sheet of paper from top to bottom of the same is insured irrespective of any departure of the inner face of the mold from a true vertical plane, and the pressing of the overlapping edges of the tube properly together is always insured.

The devices for closing the bottom of the bag are shown in Figs. 3, 4, 5, 6, 23, and 26 and comprise a forwardly and upwardly moving horizontal primary folder 145, a pair of laterally-swinging side-folders 146, and a bottom presser-foot 147. The plate 145 is hung to the lower ends of a pair of links 148, disposed one in advance of the other and suspended from a suitable bearing on the under side of a slide 149, which is suitably guided in part of the fixed frame of the machine and has reciprocating movement imparted to it at proper invervals by means of a cam 150 on the shaft 8, said cam acting on a lever 151, which is connected by a gimbal-joint to a link 152, the latter being also connected by a gimbal-joint to one arm of a bell-crank lever 153, hung to the frame of the machine and connected by a rod 154 to a lug depending from the under side of the slide 149. (See Figs. 3, 6, 23, and 26.) Each of the swinging side-folder plates 146 is carried by a rod 155, adapted to bearings in the fixed frame and in a hanger 156, depending from the slide 149, and each of said rods has formed on it teeth constituting an elongated pinion 157, with which meshes a rack 158, vertically guided in bearings in the fixed frame and connected to one arm of a yoke 159, which is formed on a vertically-guided rod 160, to which reciprocating movement is imparted at the proper time by means of a cam 161 on the shaft 16 at the end of the machine, said cam 161 acting upon a bell-crank lever 162, which is connected by a rod 163 to a bell-crank lever 164, mounted on a bracket 165 on the fixed frame of the machine and connected to the rod 160, as shown in Fig. 3. Movement is imparted to the primary-folder plate 145 by means of a cam 166 on the shaft 8, said cam acting upon a lever 167, which extends across the bottom of the machine and is connected by a gimbal-joint to one end of a rod 168, Fig. 6, the upper end of the latter being connected by a similar gimbal-joint to a lever 169, which is connected by a rod 170 to a lug on the under side of the plate 145, as shown in Figs. 3, 6, 23, and 26. The action of the primary folder upon that portion of the bag-tube which projects beyond the bottom of the mold 113 serves to produce the effect seen in Fig. 44, completely folding in against the bottom of the mold the rear portion of the tube upon which it acts and diagonally folding upon themselves the projecting sides of the tube In thus acting the primary folder always preserves its horizontal position and the first half of its forward travel—that is to say, from the line $x$ to the line $y$, Fig. 23ª—is also mainly horizontal, the amount of rise being only that represented at $w$ in Fig. 23ª, while during the remaining half of its forward travel its movement is mainly vertical, the rise being that indicated at $w'$ in Fig. 23ª. By this means I start the primary fold by direct inward pressure exerted near the bottom of the projecting end of the tube, as shown at Fig. 23ᵇ, and complete the fold by direct upward pressure, as shown at 23ᶜ, thus insuring the formation of a perfect fold without tearing the paper, as sometimes happens when a horizontal folder acts upon the paper close to the end of the mold. A primary folder which while acting always preserves the same plane is more efficient than a swinging or pivoted folder, since the latter cannot press the fold flat against the bottom of the mold unless the axis upon which it swings is exactly in line horizontally with said mold-bottom, and an accurate movement is imparted to the folder, requirements which it is difficult in practice to observe. After the primary fold has been made by the plate 145 the two side folds are turned in by the swinging side plates 146, thereby diagonally folding upon itself the front side of the tube, as shown in Fig. 45, so as to form the final fold, which is closed upon the side folds, as shown in Fig. 46, by the action of the presser-plate 147, the latter having vertical reciprocating motion imparted to it by means of a cam 171 on the shaft 8, said cam acting upon a bell-crank lever 172, hung to a bracket on the fixed frame and connected to a rod 173, which carries the presser-foot 147. Before the action of the presser-foot, however, it is necessary to withdraw the side-folders 146 and the primary folder 145. Hence when the side folds have been completed the side-folders 146 are swung back to the vertical position and the primary folder is withdrawn from beneath the side folds. A direct horizontal withdrawal of the folder 145, however, is not desirable, as in such case it sometimes has a tendency to pull out or crumple up the primary fold of the bottom, and thus render the bag useless. Hence I so form the cams 150 and 166 that they will act jointly in effecting the withdrawal of the primary folder, which is consequently retracted at an angle, as represented, for instance, by the arrow $x$ in Fig. 23$^c$, thereby overcoming the above-noted objection. This method of withdrawal slightly opens the side folds of the bottom, but the same are properly folded down again, and the final fold is creased at the base and bent over for the action of the final presser 147 by means of a diagonally-guided paster-plate 175, which applies paste to the inner side of the final fold, so as to insure the proper fastening of the same to the side folds when it is pressed upon them by the plate 147.

Figure 28:
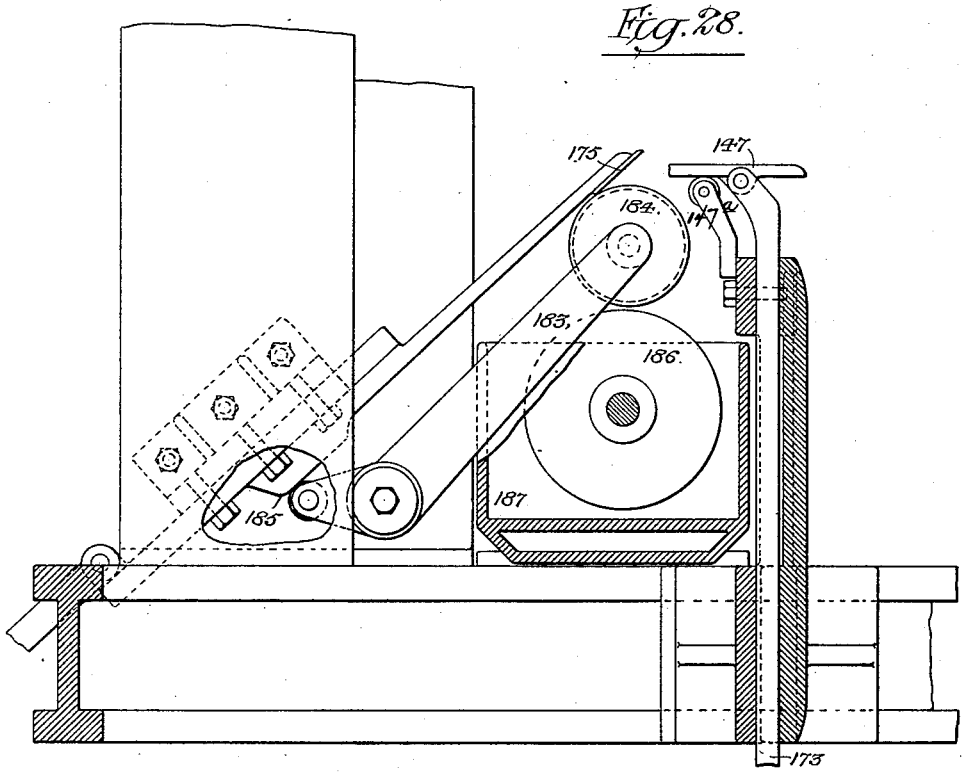

The plate 147 is pivoted to the upper end of the rod 173, so that it can swing to accord with the angle of the final fold when it first comes into contact with the same, the plate finally assuming the horizontal position when the bottom folds are pressed into contact with the mold-bottom. The plate 147 is also brought to a horizontal position when fully lowered, this result being attained by contact of the plate with an antifriction-roller on a short bracket 147$^a$, as shown in Fig. 28. Hence the plate 147 always occupies a horizontal position as it commences to rise.

The paster-plate 175 is carried by a slide 176, mounted in inclined guides on the fixed frame of the machine, so that the paster 175 will travel at an angle of about forty-five degrees in respect to the horizontal, the slide 176 being reciprocated at proper intervals by means of a cam 177 on the shaft 8, said cam acting upon a bell-crank lever 178, hung to a bracket on the fixed frame and connected to a vertically-guided rod 179, which is connected by a link 180 to a lever 181, likewise hung to a bracket on the fixed frame and connected by a link 182 to said slide 176, as shown in Fig. 3.

Hung to a bearing on the fixed frame is a lever 183, one arm of which carries a roller 184, while the other arm of the lever is acted upon by a cam 185 on the under side of the slide 176, as shown in Figs. 3 and 28. The roller 184 normally rotates in contact with a roller 186 in a paste-box 187, adjacent to the paste-box 67; but as the paster-slide 176 is moved upward the cam 185, acting upon the lever 183, causes the lifting of the roller 184, so as to bring it into contact with the under side of the paster-plate 175, and thus transfer paste to the latter, this paste being, by the continued upward movement of the paster-plate, finally applied to the upper or inner face of the final fold of the bag-bottom.

Figure 29:
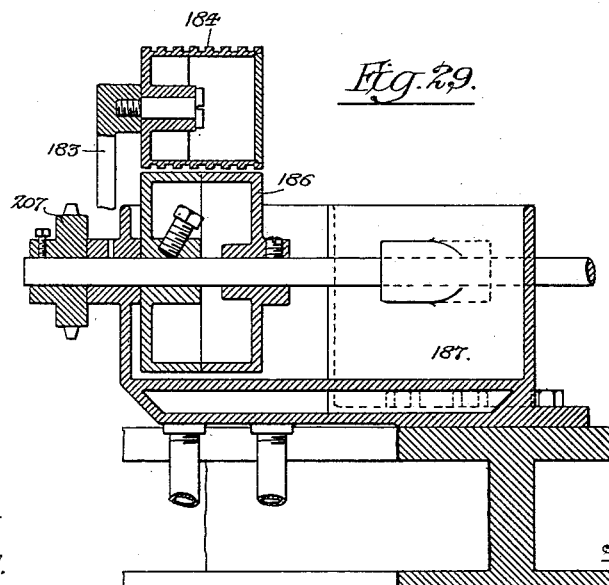

The roller 184 has a number of grooves in its periphery, as shown in Fig. 29, so as to insure the application of paste to the paster-plate 175, it having been found in practice that a smooth roll pressed against the surface of the plate will not apply sufficient paste thereto to properly paste the final fold of the bag-bottom, whereas when the periphery of the roller 184 is grooved, as described, the paste is always taken up by the plate 175 from said grooves, irrespective of the degree of pressure of the roller against the plate. For the same reason the paste-roller 65 is likewise peripherally grooved, as shown in Figs. 1 and 2.

Rotary movement is imparted to the paste-roller 186 in the box 187 and also to the roll 66 in the box 67 by gearing which is illustrated in Figs. 3, 4, and 30, and which may be briefly described as follows: On the shaft 8 is a sprocket-wheel 190, which, by means of a chain 191, drives a sprocket-wheel 192 on a short shaft 193, the latter having another sprocket-wheel 194, which, by means of a chain 195, drives a sprocket-wheel 196 on a shaft 197, the latter having a worm 198, which drives a worm-wheel 199 on a vertical shaft 200, this gearing being best illustrated in Fig. 30. The shaft 200 has a bevel-wheel 201, which meshes with a bevel-wheel 202 on a shaft 203, Fig. 4, the latter having two sprocket-wheels 204 and 205, the wheel 204 driving, by means of a chain 206, a sprocket-wheel 207 on the shaft of the roller 186, and the sprocket-wheel 205 driving, by means of a chain 208, a sprocket-wheel 209 on the shaft of the roll 66, as shown in Fig. 3.

The paste applied to the upper side of the sheet of paper at the points 64$^a$, Fig. 41, serves to unite the laps which form the side folds of the bag-bottom, and the paste which is applied at the points 64$^b$, Fig. 41, serves to unite the diagonal laps of the final fold, formed when the side folds are turned in, as shown in Fig. 45; but in order to secure the side folds to the primary fold of the bottom it is advisable to apply paste to the inner sides of said side folds, as shown at 210$^a$ in Figs. 42 and 43. This object I accomplish by means of pasters 210, which when the tilting table occupies a horizontal position, as shown in Fig. 3, project through openings 211 in said table, as shown in Figs. 1 and 3, so that when the sheet of paper is deposited on the tilting table these supplementary pasters 210 will apply paste to the under side of the sheet in such position that when the bottom of the bag is being formed the paste thus applied will occupy a position on the inner faces of the opposite side folds of the bag-bottom, as shown in Fig. 43, thus insuring a more securely-fastened bottom than when the side folds are not thus united to the primary fold. Each of the supplementary pasters is, as shown in Fig. 31, mounted upon a spring contained in a socket in an arm 212, these arms being secured to a rock-shaft 213, mounted in suitable bearings in the paste-box 67, and having outside of said box an arm 214, which is connected by a rod 215 to a lever 216, operated by a cam 217 on the shaft 8.

After the bag has been formed upon the mold 113 it is advisable to collapse said mold so that the bag can be readily removed therefrom at the proper time, and for this purpose each mold is, as shown in Figs. 33 and 34, composed of a fixed part 220, secured to the mold-wheel 114, and a movable part 221, which is carried by a slide 222, adapted to suitable guides on the under side of said mold-wheel, said slide having a stud 223, which plays in a radial slot 224 in the mold-wheel and receives a bolt 225, upon which is mounted an antifriction-roller 226, which travels in a groove formed in the under side of a cam-plate 227, fixedly mounted above the mold-wheel 114, as shown in Figs. 3 and 6. At the point where the tube is formed around a mold on the mold-wheel the cam-plate 227 is recessed for the reception of a cam-slide 228, which is adjustable radially in an opening of the cam-plate 227 by means of a screw-stem 229, acting on one of the end bars of a yoke 230, the other end bar of said yoke having a stud 231, secured to the cam-slide 228, as shown in Fig. 3. While the roller 226 of the mold-carrying slide 222 is traversing the groove of the cam-plate 227, the mold may be contracted to its fullest extent, which is slightly less than that required for making the smallest-sized bag, the size of the mold at the point where the bag-tube is formed upon it being dependent upon the position of the cam-slide 228, the guide-groove of which has a flaring mouth, as shown in Fig. 4, for receiving the antifriction-rollers 226 as they emerge from the groove of the cam-plate 227, the latter also having a flaring mouth for receiving the antifriction-rollers as they emerge from the groove of the cam-slide. The character of the cam-slide groove is such as to expand the molds to any desired extent, while the flaring mouth of the cam-groove of the plate 227 is such as to contract the molds immediately after they pass from under the control of the cam-slide. While I thus provide for making bags of any desired size, the bag, whatever size it may be, is immediately after its formation released from contact with the mold, so that it is not likely to stick fast thereto and can be readily removed from the mold when the time arrives for such removal.

In order to further prevent sticking of the bag to the mold, I find it advisable to move the bag downward on the mold to a slight extent shortly after the bottom of the bag has been formed, and for this reason the mold has a movable bottom plate 232, carried by a bar 233, which can slide in suitable guides on the interior of the fixed half of the mold, as shown in Figs. 33 and 34, said bar having at its upper end an antifriction-roller 234, which travels upon an annular rail 235, fixedly mounted on the frame of the machine above the mold-wheel, this rail having at a point some distance beyond that at which the bag is formed upon the mold a drop 236, as shown in Fig. 35, so that when the antifriction-roller reaches this portion of the track the bottom of the mold will drop, as shown at the right-hand side of Fig. 6, and will therefore carry the bag downward on the mold to the extent of said drop.

As soon as the bag has been formed upon the mold it enters a segmental drying-box 237, suitably disposed on the fixed frame of the machine, below the mold-wheel 114, the bottom of this drying-box at the inlet end being inclined or beveled, as shown in Fig. 35, so that if the final fold of the bag-bottom has opened partially after being subjected to the action of the presser-foot 147 said beveled end of the bottom plate will so act upon the fold as to restore it to its proper position and press it upwardly against the other folds. The drying-box has a segmental set of vertically-disposed heating-pipes 238 adjacent to the inner sides of the molds and a segmental set of horizontal heating-pipes 239 beneath the bottom of the molds, the said bottom pipes being at a lower level than the bottom of the box at the inlet end, and the latter having a drop corresponding to that in the rail 235, so as to permit of the lowering of the bag on the mold at the desired point, the bottom of the bag passing from the bottom of the heating-box directly onto the drying-pipes or onto a plate resting thereupon, as desired.

In order to still further aid in the drying of the bags as they are being carried through the drying-box, I provide above the cam-plate 227 a segmental pipe 240, which has branches 241 extending down through said cam-plate at points distant from each other equal to the distance from center to center of the molds of the mold-wheel, so that when a supply of hot air is forced through said pipe 240 volumes of hot air will be thrown into the interior of each mold and will escape from the bottom of the same and pass upward between the sides of the mold and the sides of the bag, owing to the loose fit of the bag on the mold, thus serving to materially aid in drying the side and bottom seams of said bag.

Each of the arms carrying the side lappers 126 and 127 has an antifriction-roller 242, which travels in a segmental groove formed in the under side of a plate 243, which is free to slide in guideways on the same portion of the fixed frame which carries the slide 149, as shown in Figs. 23 and 26, and said plate 243 has an antifriction-roller 244, which as each mold of the mold-wheel is brought into position to have a bag formed around it comes under the control of a forked cam-stud 245, secured to and depending from the slide 222 of the adjustable inner half of said mold, as shown in Figs. 2, 23, and 33. By reason of this construction the side lappers will always be caused to properly fold the paper around the inner side of the mold, irrespective of the extent to which the latter has been opened or closed.

The segmental slot in the plate 243 is not throughout its entire extent concentric with the axis of the shaft 115, around which the lapper-arms swing, the end portions of said slot being so formed that as each lapper swings laterally away from the mold on which the bag-tube has been formed it will be caused to move radially to a slight extent, so that it will not come into contact with the mold which is approaching the bag-forming position or with the bag upon the mold which is leaving the same. (See Fig. 27.)

The shaft 115, which carries the mold-wheel 114, has intermittent movements of partial rotation imparted to it by the mechanism best shown in Figs. 6, 36, 37, and 38, and which I will now proceed to describe.

The shaft has secured to it some distance above its lower end a disk 250, as shown in Figs. 6 and 38, which disk or plate is grooved for the reception of rollers 251, running upon a table or bed 252, secured to or forming part of a cross-bar constituting part of the fixed frame of the machine, and to said shaft 115 is keyed or otherwise firmly secured a notched wheel or spider 253, the number of notches therein corresponding with the number of molds upon the mold-wheel.

Mounted so as to swing freely upon the shaft 115, below the notched wheel 253, is a three-armed lever 254, which is connected by a rod 255 to an arm 256, hung to a bracket on the fixed frame of the machine and acted upon by a cam 257 on the shaft 8, as shown in Fig. 5, the rod 255 having universally-jointed connections with the lever 254 and arm 256, and being also divided centrally and threaded for adaptation to an adjusting nut 259, so that the length of the rod may be readily increased or diminished and the relation of the lever 254 to the arm 256 governed as desired.

Free to slide vertically on the hub of the lever 254 is a plate 260, to which are secured two studs 261 and 262, a segmental outer portion of this plate engaging with jaws upon a slide 263, which is mounted so as to move vertically in suitable guides on a fixed frame of the machine and has at the top an overhanging arm 264, with depending stud 265, located immediately above the stud 262.

Rising-and-falling motion is imparted to the plate 260 by a cam 266 on the shaft 8, said cam acting upon an arm 267, which is connected by a link 268 to a lever 269, said lever being forked and each fork of the lever being notched, as shown in Figs. 37 and 38, for engagement with pins 270, projecting from a two-part ring 271, which is adapted to a groove in the hub of the plate 260. When the plate 260 is raised, as shown in Fig. 6, its lugs 261 262 engage with notches in two oppositely-projecting arms of the lever 254 and also with notches in the wheel 253. Hence if said lever 254 is vibrated while the parts are in this position corresponding movement will be imparted to the notched wheel 253 and the latter can be moved to the extent of one notch, so as to move the mold-wheel to the extent of the distance from center to center of the molds thereon. If the plate 260 is then depressed, it will carry with it the slide 263 and the lug 265 of the latter will enter the notch of the wheel 253 before the lug 262 is withdrawn therefrom. Hence the wheel 253 is in the intervals between its movements firmly locked in position, being at no time free from the control of one or other of the lugs 262 and 265. When the plate 260 has been lowered to its full extent, its lugs 261 and 262 have been withdrawn from the notches of the wheel 253, but still remain in engagement with the notches of the lever 254. Hence when the latter swings backward it will carry the plate 260 and its lugs with it, so as to bring said lugs into position for engaging a fresh pair of notches of the wheel 253 preparatory to a further forward movement of the same.

By using a pair of lugs 261 and 262 on the plate 260 power is applied to the wheel 253 at diametrically-opposite points, and the strain caused by applying power to one point on the wheel is materially relieved. The device, moreover, is very compact, owing to the fact that the movements of engagement and disengagement of the studs are vertical instead of radial.

As each mold, with the bag upon it, emerges from the drying-box the bag is discharged downwardly from the mold by means of a blast of air derived from an air-pipe 272, having a valve 273, with downwardly-projecting branch 274, which discharges into a box 275, resting lightly upon the top of the mold-wheel and free to slide vertically on the lower end of the pipe 274, although prevented from moving forwardly with the mold-wheel by reason of its engagement with said pipe. The box 275 has in its bottom an opening which as each mold is moved into position beneath the box communicates with a central pipe 276, carried by the bottom of the mold and projecting up through the mold-wheel 114. As the mold is moved into position beneath the box 275 the antifriction-roller 234 on the rod 233, which carries the movable mold-bottom, strikes one arm of a lever 277, hung to a bracket on the arch of the main frame, the other arm of said lever engaging with the stem of the valve 273 and moving said valve, so as to open the same and permit a blast of air to pass through the pipe 276 of the mold and blow the bag downwardly from the latter.

It occasionally happens that a bag will stick upon the mold—that is to say, it will not drop therefrom when its support is removed, nor can it be blown off—and even if devices are employed for pulling the bag from the mold by grasping the bottom of the same the bottom of the bag is sometimes pulled out, leaving the bag upon the mold. In order to insure the stripping of the bag from the mold when it is not properly discharged therefrom by the means employed for the purpose, I use a stripper-plate 530, Figs. 5 and 6, which is so disposed that it will fit snugly against the outer side of each mold 113 above the bag thereon as the mold reaches the discharge-point. The stripper-plate is carried by a rod 531, which is vertically guided in a bracket 532 and is connected by a link 533 to an arm 534, which is secured to a rock-shaft 535, adapted to a bearing upon any convenient portion of the fixed frame—for instance, upon that frame which carries the receptacles and measuring devices hereinafter referred to. (See Fig. 8.) The rock-shaft 535 has another arm 536, which is connected by a link 537 to an arm 316, Figs. 8 and 9, the latter forming part of certain mechanism for pasting the tops of the bags, as hereinafter set forth, so that there will be a vertical reciprocation of the stripper-blade in contact with each mold 113 as the molds in succession are brought to rest in position for said action.

Each bag as it is delivered from the mold of the mold-wheel is deposited in a bag-carrier 280, a series of these bag-carriers being mounted upon the links of a pair of endless chains 281, which have antifriction-rollers 282, adapted to run upon longitudinal rails 283, secured to the fixed frame of the machine, or to engage with notches in the peripheries of two pairs of wheels 284 and 285, mounted, respectively, upon shafts 286 and 287, which are adapted to bearings on the fixed frame of the machine, the shaft 287 having movement of partial rotation imparted to it by means similar to those employed for imparting movement of partial rotation to the mold-wheel 114 and lettered, respectively, 253$^a$ to 271$^a$, respectively. The mechanism, however, includes two slides 263$^a$, with their appurtenances, instead of one, owing to the fact that the notched wheel 253$^a$ is of greater diameter than the notched wheel 253 and has somewhat harder work to perform.

In order to guide the bag in its passage from the mold into the carrier 280, I employ a guide-frame 290, secured to a bracket on the fixed frame and having a movable side 291, so as to permit the bag to leave it as the bag-carrier moves forward, said movable side of the bag-guiding frame being carried by a slide 292, which is connected by a link 293 to an arm 294, secured to a rock-shaft 295, which is mounted in a bracket on the fixed frame of the machine, and has another arm 296, actuated by a cam 297 on the shaft 8. As the bags are carried forward they rest upon rails 300, which extend from the notched wheels 284 to the wheels 285 and preferably also about half-way around said wheels 285, as shown in Fig. 12. Each of the bag-carriers 280 has an internal bar 302, Fig. 9, which has stems 303 passing through one side of the carrier and having a head 304, which is acted upon by a rail 305, whereby the bar 302 can be adjusted laterally in the carrier to an extent depending upon the size of the bag, the purpose of this bar being to "center" the bag in the carrier—that is to say, to maintain the bag in contact with the opposite side of the carrier, so that its mouth will be in position to receive the charge of material delivered by the weighing and filling devices. The rail is preferably of angular cross-section, so that it may engage either with the outer side of the head 304 to push the bar 302 inward, as shown at the upper part of Fig. 9, or with the inner side of said head, as shown at the lower part of Fig. 9, so as to pull the bar 302 outward after the bag has been ejected from the carrier and before a new bag is introduced into the same. That portion of the rail 305 which acts to push the head inwardly is preferably rendered adjustable, so that it may be made to accord with the size of the bag contained in the bag-carrier, it being desirable to avoid any compression or rigid confinement of the bag, the purpose of the bar 302 being simply to push the bag over into contact with the opposite side of the carrier without otherwise compressing or confining the same. In fact, the sides of the bag only touch the sides of the carrier and the bar throughout a limited area, as shown in Fig. 7$^a$, so that the shaking of the bags in the carriers or the ejection of the bags therefrom can be readily effected without any withdrawal of the bar. Distension of the bag in the carrier does not have to be guarded against, because as all of the seams of the bag have been thoroughly dried before said bag enters the carrier the bag will not stretch when the material is dumped into it.

The open mouths of the bags are pasted before said bags receive their contents from the weighing and filling mechanism, the devices employed for thus pasting the open mouths of the bags being shown in Figs. 7, 8, and 9. In the arched portion of the fixed frame is guided a slide 310, which has at its lower end projections 311 and 312, (see Fig. 9$^a$,) this slide having rising-and-falling movement imparted to it at suitable intervals by means of a cam 313 on the shaft 8, said cam acting through the medium of an arm 314, connecting-rod 315, forked lever 316, and links 317. The slide 310 is tubular for the reception and guidance of a rod 318, which has at its lower end a head 319, and this rod likewise has a rising-and-falling movement imparted to it by a cam 320 on the shaft 8, said cam acting through the medium of an arm 321, rod 322, and lever 323. Suitable brackets 325 on the fixed frame carry transverse rods upon which are mounted right-angled frames 326, and to the latter are hung opposite pairs of paster-arms 327 and 328, connected by links 329, so as to vibrate in unison, the frames 326 being moved toward and from each other by the action of a slotted cam-segment 330, acting upon pins 331 on said frames, as shown in Figs. 7, 9, and 40. The cam 330 is vibrated at appropriate intervals by means of a cam 332, acting through the medium of a lever 333 and connecting-rod 334. (See Figs. 7 and 9.) The pasting-arms 327 and 328 are caused to swing by means of the cam 335 on the shaft 10, said cam acting through the medium of a lever 336 and connecting-rod 337, as shown in Figs. 7 and 9. Each of the arms 327 and 328 has at its lower end a paster-plate 338. Suitably mounted on the frame of the machine are two paste-boxes 340 and 341, the box 340 having a paste-roller 342, which is intermittently rotated by means of a rack-bar 343, acting on a ratchet-wheel 344 on the shaft of the roller, said rack being connected to the lever 316, so that it will rise and fall with the same. In like manner the paste-box 341 contains a roller 345, the shaft of which has a ratchet-wheel 346, engaging with a rack-bar 347, which is connected to the lever 336. The paste-roller 342 and its shaft and ratchet-wheel are carried by slides 350, mounted on the paste-box 340, and these slides also carry the paste-roller 351, which rotates in contact with the periphery of the paste-roller 342 and receives paste from the same. The slide 350 is reciprocated on the paste-box 340 by means of a cam 352 on the shaft 8, said cam acting on an arm 353, which is connected by a rod 354 to an arm 355 on a rock-shaft 356, mounted in suitable brackets on the paste-box, said rock-shaft carrying a lever 357, which is connected with the slide 350 by means of links 358. The lever 357 is also connected to a slide 359 on the under side of the paste-box 340, this slide having at its inner end a head 360.

Supposing the parts to be in the position shown in Fig. 9, the frames 326 are drawn toward each other, so as to cause paste to be applied to the projections 312 of the slide 310 by the pasting-plates 338 of the arms 328, and at the same time the pasting-plates 338 of the arms 327 are brought into contact with the sides of the paste-roller 345, so as to receive paste therefrom. The projection 311 receives paste from the roller 351. The frames 326 are then separated, and the arms 327 and 328 swing upward until the pasting-plates of the arms 328 are alongside of the paste-roller 342 and the pasting-plates of the arms 327 are in line with the projections 312 on the slide 310, which has meantime descended, so as to enter the open mouth of the bag. There is now another inward movement of the frames 326, so as to bring the pasting-plates of the arms 327 into contact with the outside of the bag, thereby pressing the inside of the same against the pasted projections 312, while at the same time the pasting-plates of the arms 328 are brought into contact with the sides of the paste-roller 342. The plunger 319 descends to the bottom of the bag simultaneously with the descent of the slide 310 into the open mouth of the bag, and when the arms 327 and 328 move inward, as above described, the sliding rod 359 is projected, so that the head of the same will press the bag against the pasted projection 311 of the slide 310, the latter having received paste from the roller 351 when the slide was elevated and said roller projected. The paste applied to the open top of the bag by the projections 312 is represented at $312^a$, Fig. 41, and corresponds as to position with that applied to the bottom of the bag at $64^a$, and the paste applied by the projection 311 is shown at $311^a$, Fig. 41, and serves the same purpose as that applied at $64^b$, while the paste applied by the plates 338 of the arm 327 is shown at $338^a$, Fig. 42, and corresponds with that applied by the supplementary pasters 210. Hence I provide for the equally-secure sealing of both the bottom and top of the bag. After the bags have had their mouth portions pasted in the manner described they are filled with measured and weighed quantities of material, and in the machine which I have devised a series of bags are filled at one time, there being two sets of weighing and measuring apparatus operating alternately, although but a single set may be used, if desired. In the present instance there are in each set of measuring and weighing devices five units, so that five bags are filled simultaneously. The sleeves 17 and 23 carry the cams which operate the measuring, weighing, and discharging devices. Hence said sleeves are geared to move at one-tenth the speed of their respective driving-shafts 8 and 10, the speed of each sleeve in respect to its shaft being determined by the number of bags which are to be simultaneously filled.

With two sets of measuring and weighing apparatus the time allowed for properly filling the hoppers of the weighing-scales is that required for the manufacture of twice the number of bags which the machine is designed to simultaneously fill, for in the intervals between the operations of each set of weighing devices five bags must be moved into position step by step, must then be filled and then moved out of position step by step, to be replaced by five empty bags, so that ample time is afforded for the perfect operation of each set of measuring and weighing devices.

The character of the measuring, weighing, and filling mechanism will be understood on reference to Figs. 7, 8, 10, and 39. At the top of the machine is a receptacle 361, in which is deposited in bulk the powdered or granular material with which the bags are to be filled, and immediately below this receptacle on opposite sides of a longitudinal partition-plate 362 are two series of measuring vessels 363 and 364, as many of these being employed in the series as there are bags to be simultaneously filled. The size of each receptacle is governed by an adjustable slide-plate 365, having a stem provided with a yoke 366, which has a nut engaging with a screw-stem 367, longitudinally confined to the frame of the machine, so that said slide-plate may be advanced or retracted in order to contract or enlarge the capacity of the measuring vessel. At the top of each series of measuring vessels are a corresponding series of sliding valve-plates 368 and at the bottom of said measuring vessels a similar series of sliding valve-plates 369. The upper valves 368 of the vessels 363 are operated by means of a cam 370 on the sleeve 17 and the lower valves by a cam 371 on said sleeves, the upper and lower valves of the series of measuring vessels 364 being operated, respectively, by means of cams 372 and 373 on the sleeve 23. The cam 370 acts upon the upper valves 368 of the series of measuring vessels 363 through the medium of a lever 374, which is connected by a link 375 to a rod 376, connecting the entire series of valves, the lower valves 369 being correspondingly operated by the cam 371 through the medium of a lever 377, link 378, and rod 379. The cam 372 acts upon an arm 380, secured to a rock-shaft 381, which is mounted in a bracket on the fixed frame and has at its opposite end another arm 382, connected by a link 383 to a rod 384, which connects the upper series of valves of the measuring vessels 364, the cam 373 acting upon an arm 385, which is secured to a sleeve mounted on the shaft 381 and carrying an arm 386, which is connected by a link 387 to a rod 388, which connects the lower series of valves 369 of said measuring vessels 364. The cams are so formed that when the upper valves are retracted the lower valves will always be projected, as shown at the left-hand side of Fig. 10, so that material will flow from the receptacle 361 into the measuring-boxes, the upper valves 368 being always closed before the lower valves 369 are opened, as shown at the right-hand side of Fig. 10, so that when the contents of the measuring-boxes are being discharged fresh material cannot flow into said boxes from the receptacle 361. Immediately below each of the measuring vessels 363 and 364 is a hopper 390 with a spout 391, adapted to discharge into one of the weighing-scoops 392, so that by first withdrawing the upper valve of a measuring vessel and permitting material from the receptacle 361 to flow into the same until it is filled, then closing said upper valve and withdrawing the lower valve, the contents of the measuring vessel will be fed through the hopper and its spout into the weighing-scoop. The receptacle 361 has a central conical deflector 393 for directing the material sidewise to the measuring vessels 363 and 364, and in order to prevent crushing or breaking of any grains of material when the upper valves 363 are moved inwardly the under side of said deflector 393 is provided with a brush 394, which overlaps the inner edge of each valve 368 when the same is closed and owing to its yielding character prevents the crushing or breaking of any grains of material caught between it and the valve.

The measured quantity of the material fed to the weighing-scoop is designedly slightly less than the required amount, and in order to bring the quantity up to the required weight a supplementary feed of a limited quantity of material is required, this supplementary feed being effected in the following manner: Projecting laterally from the receptacle 361 are a series of casings 395, the lower portions of which project into hoppers 396, located between the valves 368, said hoppers having downwardly-extending spouts 397, which terminate in or above the hoppers of swinging tubes 398, hung to brackets on the fixed frame and having arms connected by links 399 to their respective weighing-scoops. Within each of the casings 395 is a notched drum 400, the drums of the entire series of casings at one side of the receptacle 361 being carried by a shaft 401 and the drums of the casings on the other side of said receptacle being carried by a like shaft 402, which shafts are rotated in opposite directions by means of a sprocket-wheel 403 on the shaft 8, said sprocket-wheel engaging with a chain 404, which passes around sprocket-wheels 405 on the shafts 401 and 402 and also around an idler-sprocket 406, mounted on a bracket of the frame. Each of the drums 400 has recesses or pockets in its periphery, as shown in Fig. 39, and as the drums are rotated these pockets receive a limited quantity of material, which is carried around thereby and finally dropped into the hopper 396, any surplus material being removed from the periphery of the drum by means of a brush 407, and the passage of material down between the drum and the casing of the receptacle 361 being prevented by a suitable filling-piece 408. As soon as the scale-pans are elevated the swinging spouts discharge into the said pans, as shown in Fig. 10; but as soon as the pan has received its proper amount of material and drops the swinging spout is moved laterally, so as to discharge into a spout 409, which leads to a suitable receptacle beneath the machine. The scale-pans are hung to ordinary scale-beams 410, swung upon standards carried by a suitable longitudinal table on the machine, each end of the scale-beam having a suitable depending guide-yoke and stem and that end of the scale-beam opposite to the one which carries the scoop being provided with a weight 411. Each of the weights 411 has a yoke 412, which is adapted to be engaged by the hooked end of an arm 413, each series of arms 413 being secured to a rock-shaft 414, which extends throughout the length of the row of scales at its respective side of the machine, and also has a series of arms 415, which overlap pins at the inner ends of swinging gates 416, hung to the scale-pans and serving normally to close the outlets of the latter. Each rock-shaft 414 also has fingers 417, which project beneath the pins of the swinging gates, as shown in Fig. 10. At one end of each rock-shaft 414 is an arm 419, which is connected by a rod 420 to an arm 421 on a rock-shaft 422, adapted to bearings in suitable brackets on the fixed frame, this rock-shaft having another arm 423, which is connected by a rod 424 to an arm 425, hung to a bracket on the fixed frame, the arm at one side of the machine being acted upon by a cam 426 on the sleeve 17 and that at the other side of the machine being acted upon by a similar cam 426 on the sleeve 23. When, therefore, a row of scale-pans has been properly loaded, the scale-pans have descended, and a series of bags have been moved in position to receive the contents of said scale-pans, the rock-shaft 414 corresponding to said row of scale-pans is vibrated so as to lift the swinging gates 416 of the same and permit the contents to pass into central hoppers 427 and thence through the spouts of said hoppers into the bags, and at the same time the arms 413 by engagement with the yokes 412 of the weights 411 lift the latter from the scale-beams and thus prevent the scale-pans from rising, as they would otherwise have a tendency to do as soon as sufficient material had been discharged therefrom to reduce the weight remaining therein below the weight on the other arm of the scale-beam. When all of the contents of the scale-pans have been discharged, the rock-shaft 414 is vibrated so as to raise the arm 415 and depress the arms 413, thus restoring the weights 411 to the scale-beams and causing the scale-pans to rise and the sliding gates to close, and in order to insure the proper closing of these sliding gates the projecting fingers 417 press upwardly upon the pins of the same as the arms 415 rise. The weights 411 are recessed, as shown in Fig. 10$^a$, so that the arms 413 do not interfere with the drop of the scale-pans when the same are properly loaded.

As the bags have paste applied to the inside of the projecting mouths of the same, it is advisable in packaging some kinds of material to protect the pasted sides of each mouth as the material is being fed into the bag, and for this purpose I mount upon the downwardly-projecting spout of each of the hoppers 427 a tube 428, each of these tubes being engaged by the forked end of an arm 429, which projects inwardly from a rock-shaft 430, mounted in suitable bearings on the frame of the machine, said rock-shaft having an arm 431, which is engaged by one arm of a lever 432, hung to a rock-shaft 433, which is carried by brackets on the frame of the machine, and the other arm of said lever 432 being acted upon by a cam 434 on the sleeve 17. By reason of this construction the tubes 428 will be lowered into the mouths of the series of bags as soon as the latter come to rest beneath the hoppers 427 and will remain in this lowered position while the contents of the bags are being introduced into the same and will then be raised so as to permit of the further forward movement of the filled bags.

It is advisable in many cases to shake or agitate the bags while they are being filled, so as to cause the contents of the bag to settle down closely therein, and this result I accomplish by means of a toothed wheel 435 on the sleeve 17, said wheel acting upon a spur at the lower end of an arm 436, which is secured to the rock-shaft 433, said rock-shaft having at each end another arm 437, which is connected by means of links 438 to a longitudinal rod 439, carrying a series of fingers 440, which carry a bar 444, projecting upwardly between the bag-supporting rails 300 of the machine and serving to act upon the bottoms of the bags, so as to impart a slight but quick vertical reciprocation thereto while they are being filled. As the bar 444 is being constantly reciprocated, I bevel the forward end of the same, as shown in Fig. 8$^a$, so that the bags can move over said end of the bar even when the latter is at the upper limit of its stroke. I also prefer to shake each filled bag separately after it leaves the filling devices and before the closing of the top of the bag, and for this purpose I use a larger toothed wheel 441, secured to the shaft 8 and acting upon a spur carried by a bell-crank lever 442, which is mounted upon a stud on the fixed frame of the machine and carries a rod 443, with upwardly-projecting finger 445, beyond the end of the bar 444. Hence each filled bag as it passes onward is subjected to the action of this additional shaker, which reciprocates much more rapidly than the shaker-bar 444, owing partly to the fact that the toothed wheel 441 is of greater diameter than the toothed wheel 435 and partly to the fact that it rotates at a much higher rate of speed. The side walls of the bag-carriers are recessed or notched at the bottom, as shown in Figs. 6, 9, 10, and 13, to permit of the vertical play of the shakers 444 and 445. The mechanism for closing the tops of the filled bags is substantially similar to that employed for forming the bottoms of the bags and comprises a primary-folding plate 450, side-folders 451, and a final swinging folder 452, as shown in Fig. 13. The plate 450 is mounted by means of a pair of links 453 upon a slide 454, so that while it moves back and forth with said slide it can also move forward and downward or backward and upward independently thereof, while, however, preserving its parallelism therewith. The side-folders 451 are carried by toothed shafts 455, and the final folder 452 is pivoted to a plate 456, projecting from the fixed frame of the machine.

Sliding motion is imparted to the plate 454 by a cam 457 on the shaft 10, this cam acting on an arm 458, which is connected by a link 459 to an arm 460, secured to a rock-shaft 461, which can turn in a bracket on the fixed frame and which has another arm 462, connected by a link 463 to a stud 464, depending from the outer end of said slide 454, as shown in Fig. 13. Parallel movement of the primary-folding plate 450 is effected by means of a cam 465 on the shaft 10, said cam acting on an arm 466, which is connected by a link 467 to an arm 468 on a hub 469, which can turn freely on a rock-shaft 461, said hub having another arm 470, which is connected by a bent rod 471 to ears on the back of the plate 450. The rack 472, which engages with the toothed shaft 455 of the side-folders 451, is actuated by a cam 473 on the end shaft 16 of the machine, said cam acting upon an arm 474, which is secured to a rock-shaft 475, mounted in bearings in one of the side frames of the machine, said rock-shaft also having an arm 476, which is connected by a link 477 to the rack 472, as shown in Fig. 11. The final folder 452 is operated by a cam 478 on the shaft 8, said cam acting upon a bell-crank lever 479, which is hung to a shaft 479ª and is connected by a link 480 to said final folder 452, as shown in Figs. 11 and 13.

In order to apply paste to the inner side of the final fold, I use a diagonally-reciprocating paster-plate 481, which is carried by a slide 482, mounted in inclined guides on the frame of the machine and connected by a link 483 to a lever 484, which is mounted upon a stud 485, projecting from one of the top frames of the machine, and is connected by a link 486 to an arm 487, which is acted upon by a cam 488 on the shaft 8. Paste is applied to this final paster-plate by means of a roller 490, carried by arms 491, secured to a rock-shaft 492, which is mounted in brackets on the fixed frame and has an arm 493, connected by a link 494 to a lever 495, which is also hung to the shaft 479ª, and is acted upon by a cam 496 on the shaft 8. By this means the paste-roller 490 is carried alternately downward into contact with the plate 481 and upward into contact with a paste-roller 497, which is contained in a paste-box 498, mounted on the frame of the machine, the shaft of said roller 497 having a sprocket-wheel 499, which is driven by means of a chain 500 from a sprocket-wheel 501 on the same shaft 502 which carries the idler-sprocket 406 for the chain 404. After the tops of the bags have thus been closed and pasted they come immediately under the influence of a segmental retainer 503, which embraces the outer portion of the sprocket-wheel 285 and extends under the machine to a point at which the filled and closed bags are ejected from the bag-carriers, and this retainer may throughout the whole or any desired portion of its extent be hollow for the reception and circulation of steam or hot air, so as to act as a drier for the folded and pasted tops of the bags, said retainer serving to support the filled bags when they reach the final run of the chain 284 and are fully reversed, the segmental portion of the retainer being pressed upon by the tops of the filled bags with gradually-increasing force from the time they pass the horizontal line of the sprocket-wheels 285 until they reach the final fully-reversed position.

The bag is discharged from the machine by means of the mechanism shown in Figs. 14 and 15 and comprising a vertical ejector 505, a side pusher 506, and a lateral take-off belt 507, the latter being carried by pulleys 508 and 509, mounted upon shafts which are adapted to suitable bearings in the fixed structure of the machine, the shaft of the outer pulley 509 having a sprocket-wheel 510, which receives a drive-chain 511 from a sprocket-wheel 512 on the shaft 10, the latter shaft also having a cam 513, which acts upon an arm 514, connected by a link 515 to a lever 516, hung to a bracket on the fixed frame, the inner end of said lever being connected by a link 517 to a vertical slide 518, mounted in suitable guides in the cross-bar of the fixed frame and carrying at its upper end the ejector-plate 505, onto which the bag is carried as it leaves the lower portion of the retainer and support 503. As soon as the bag has been lifted to the position shown in Fig. 14 it is subjected to the action of the side pusher 506, which is carried by a slide 519, mounted in a bracket on the fixed frame and connected by a link 520 to an arm 521, which is vibrated by means of a cam 522 on the shaft 8. The pusher 506 delivers the bag onto a right-angled frame 523, which is carried by a rock-shaft 524, adapted to a bearing on the fixed frame and having an arm 525, which is connected by a link 526 with the lever 516, so that the same movement of said lever which lowers the ejector 505 causes the frame 523 to turn, so as to lay the bag upon the conveyer-belt 507, by which it is carried to the point of discharge.

It will be observed on reference to Figs. 1 and 2 that the roller 65, which applies paste to the projections 49 and 64 of the sheet-lifter, is composed of two independent parts—namely, the narrow end portion for applying paste to the long strip 49 and the main or body portion for applying paste to the projections 64, and said narrow end portion is capable of rotating independently of the body portion, so that the latter is only caused to turn during the limited time when it is in contact with the projections 64, thereby reducing friction and wear.

The cam 137, which operates the lapper 127, is by preference so formed as to impart a return movement to said lapper after the latter has pasted down the final flap of the bag-tube, which will be slower than the forward movement of the mold, so that said lapper will roll over the side seam of the bag as the latter is carried forward, and hence will press said seam and insure the secure confinement of the overlapping edge of the paper sheet.

Although I prefer in carrying out my invention to use the rotary wheel for carrying the series of molds and the endless chains for supporting and traversing the bag-carriers, it will be evident that any desired form of endless carrier for the molds and any other available means of supporting, guiding, and traversing the bag-carriers may be adopted without departing from the essential features of my invention.

Having thus described my invention, I claim and desire to secure by Letters Patent—

1. The combination of the sheet-support, a sheet-lifter having paste-applying projections on the under side of the same, means for raising and lowering the lifter and for moving it to and fro, means for applying paste to the projections of the lifter, and a push-off plate spring-supported upon the lifter-carrier and having pins adapted to pass through openings in the lifter-plate, substantially as specified.

2. The combination of the sheet-support, a sheet-lifter carried by a horizontal slide, a vertical slide having guides for said horizontal slide, and means for reciprocating said slides in their respective directions of movement, substantially as specified.

3. The combination of the sheet-support, a sheet-lifter having long and short paste-applying projections on the under side of the same, means for raising and lowering said lifter and for moving it to and fro, and a roll for applying paste to the projections of the lifter, said roll consisting of independently-rotatable sections disposed side by side whereby each will be caused to rotate only when in contact with the projection to which it is to apply paste, substantially as specified.

4. The combination of the sheet-support, the sheet-lifter, means for operating the latter, a push-off device carried by the lifter and having pins pressed downwardly by springs, and means for moving said pusher so that said pins will remove the sheet from the lifter, substantially as specified.

5. The combination of a sheet-support, a sheet-lifter and conveyer having projections for applying paste to the upper side of the sheet, a platform onto which the sheet is delivered by the lifter, and pasters for applying paste to the under side of the sheet while it rests upon said platform, substantially as specified.

6. The combination of a platform, means for laying sheets of paper in succession thereupon, means for tilting the platform after each sheet is deposited upon it, one or more paster-fingers adapted to pass through openings in the platform and to paste the under side of the sheet while thereupon, a paste-roll, and means for moving said pasters into contact with said paste-roll when the platform is elevated so as to be free from engagement with said pasters, substantially as specified.

7. The combination of a mold-carrier, a tilting platform, means for laying sheets of paper in succession onto said platform, means for tilting the same after each sheet of paper is laid upon it, nippers for drawing the upturned sheet of paper laterally away from the platform and in front of the mold, and means for reciprocating said nippers and for opening and closing the same, substantially as specified.

8. The combination of means for successively feeding sheets of paper, a pair of nippers, a slide carrying the nipper-jaws, a rod guided upon said slide and adapted to operate the nippers, guides for said slide and swinging arms having the same axis for reciprocating the slide and rod independently, substantially as specified.

9. The combination of the mold-carrier and its projecting molds, means for imparting intermittent movement to said mold-carrier, means for folding a sheet of paper upon three sides of the operative mold, swinging lappers for lapping the edges of the sheet on the fourth side of the mold, hubs in which the stems of said swinging lappers are guided so as to move to and fro, and means for vibrating said hubs around an axis, substantially as specified.

10. The combination of a mold-carrier having a series of projecting molds, means for intermittently moving said carrier, means for folding a sheet of paper around three sides of a mold, while the latter is stationary, a swinging lapper for folding one of the edges of the paper on the fourth side of the mold, and means for moving said lapper at a less rate of speed than the movement of the mold, whereby the lap is drawn under the lapper as the mold travels, substantially as specified.

11. The combination of a traveling mold-carrier having molds with adjustable sections, and a controller acting upon the adjustable sections of the molds so as to cause them to expand or contract as they are carried around by the mold-carrier, said controller acting to move the mold-sections in both directions and also being adjustable so as to vary the extent of projection and retraction of the mold-sections, substantially as specified.

12. The combination of a traveling mold-carrier having expansible and contractible molds thereon, slides carrying the adjustable sections of said molds, a cam-plate controlling said slides and having a gap therein, and a cam-slide adjustable in said gap, substantially as specified.

13. The combination of a traveling mold-carrier having expansible and contractible molds thereon, slides carrying the adjustable sections of said molds, a cam-plate controlling said slides and having a gap therein, and a cam-slide adjustable in said gap, both the cam-plate and the cam-slide having grooves with flaring mouths, substantially as specified.

14. The combination of the traveling mold-carrier having molds with adjustable sections so as to vary the size of the molds, a movable controller acting upon the molds in succession and governing the position of the movable section of each mold, means for lapping the edges of a sheet of paper on the mold, and guides for said lappers engaging with the movable mold-controller, substantially as specified.

15. The combination of a traveling mold-carrier having projecting molds with movable bottoms, a stationary cam whose throw is less than the length of a mold, for controlling the position of said movable bottoms of the molds, whereby the bags are caused to move vertically to a slight extent in the molds as the mold-carrier travels, but are not withdrawn from the molds, substantially as specified.

16. The combination of a traveling mold-carrier having projecting molds, movable mold-bottoms having stems with rollers thereon, a stationary cam whose throw is less than the length of a mold and upon which said rollers are supported and can travel, whereby the bottoms of the molds are raised and lowered as the mold-carrier travels and the bags are caused to move vertically in the molds but are not withdrawn therefrom, substantially as specified.

17. The combination of a traveling mold-carrier having projecting molds, movable mold-bottoms having stems with rollers thereon, a roller-supporting track having an offset therein, and a bag-supporting plate in two different planes, one below the other, substantially as specified.

18. The combination in means for closing the end of a bag, of primary and secondary folders for folding in the projecting end of the tube to form the bag top or bottom, and means for imparting to the primary folder a combined forward-and-backward and upward-and-downward motion but retaining it in the same plane while acting upon the bag, substantially as specified.

19. The combination in means for closing the end of a bag, of primary and secondary folders for folding in the projecting end of the tube to form the bag top or bottom, and means for maintaining the primary folder while in action in a plane at right angles to the bag and giving to it first a substantially-horizontal and then a substantially-vertical movement, as described.

20. The combination in means for closing the end of a bag, of a slide carrying a primary folder mounted thereon by a parallel-motion hanger, whereby it preserves the same plane, side-folders also carried by the slide and adapted to swing upon an axis, means for reciprocating said slide and means for operating the folders, substantially as specified.

21. The combination of a bag-mold, means for forming thereon a paper tube with projecting end, and bottom-closing devices consisting of a primary folder, swinging side-folders and a final presser, the latter moving in a plane parallel with the mold, but being pivotally mounted upon its operating device so that it is free to tip or tilt thereon, substantially as specified.

22. In a bag-closing device the combination of a primary folder, opposite side-folders and a final-fold presser, operating in the order named, and a diagonally-guided paster-plate for applying paste to the inner side of the final fold before the pressing of the same, substantially as specified.

23. In a bag-closing device, the combination of a primary folder, opposite side-folders and a final-fold presser, operating in the order named, and a diagonally-guided paster-plate for applying paste to the inner side of the final fold before the pressing of the same, said paster-plate being projected to the base of the final fold so as to crease the same and cause it to bend over the plate, substantially as specified.

24. In a bag-closing device, the combination of a primary folder, opposite side-folders, and means for imparting to the primary folder a diagonal movement as it is withdrawn from above the primary fold, substantially as specified.

25. In a bag-closing device, the combination of a primary folder, opposite side-folders, a final presser, a diagonally-guided paster-plate for the final fold, means for imparting to the primary folder a diagonal movement as it is withdrawn from above the primary fold, and means for operating the diagonal paster in advance of the final-fold presser, substantially as specified.

26. The combination of a sliding paster-plate, a roll for applying paste thereto, a pivoted structure carrying said roll and a cam on the paster-slide adapted to act upon the paster-roll carrier so as to cause the same to swing as the paster-slide is reciprocated, substantially as specified.

27. The combination of a traveling mold-carrier having a series of projecting molds, with movable bottoms, means for operating said movable bottoms so as to cause them to rise and fall as the mold-carrier travels, and a support for the bottom of the bag also having a drop to permit of the lowering of the bag on the mold by the drop of the mold-bottom, substantially as specified.

28. The combination of a bag-mold, constructed so as to be expanded and contracted, and having a movable bottom, means for forming a bag on the mold, and means for subsequently contracting the mold, whereby the movable bottom can readily push the bag downward thereon, substantially as specified.

29. The combination of a hollow bag-mold and means for forming a bag thereon, means for contracting the mold after the formation of the bag, an air-supply pipe communicating with the interior of the mold and an outlet from the interior of the mold whereby the air can pass from the same and can escape between the sides of the contracted mold and the sides of the bag, substantially as specified.

30. The combination of a traveling mold-carrier having projecting hollow molds thereon, means for forming bags upon such hollow molds, means for contracting the mold after the formation of the bag and an air-supply pipe having branches communicating with the interior portions of the molds so as to force air simultaneously into a series of molds, substantially as specified.

31. The combination of a bag-mold having a movable bottom, means for forming a bag upon said mold, means for raising and lowering the bottom of the mold, mechanism for contracting the mold after the bag is formed thereon and means for forcing air into the mold when the bottom of the same is lowered, substantially as specified.

32. The combination of a traveling mold-carrier having a series of projecting molds, means for forming bags on said molds, a series of traveling bag-carriers operating in conjunction with the molds, air-blast apparatus for blowing the bags from the molds into said carrier, and a tube for guiding the bags in their transfer from the molds to the bag-carriers, substantially as specified.

33. The combination of a traveling mold-carrier having a series of projecting molds, means for forming bags on said molds, a series of traveling bag-carriers operating in conjunction with the molds, air-blast apparatus for blowing the bags from the molds into said carrier, and a tube for guiding the bags in their transfer from the molds to the bag-carriers, said tube having a movable side in connection with means for withdrawing it at intervals, substantially as specified.

34. The combination of a pair of endless chains disposed side by side with a space between them, a series of bag-carriers mounted thereon and open at both top and bottom so that the bags can slide vertically therein, a support for the bags independent of the chains, and upon which the bags rest without exerting any downward pressure upon the chains, sprocket-wheels for driving said chains, and a support for the upper runs of the chains while they are traveling from one sprocket-wheel to the other, substantially as specified.

35. The combination of a traveling mold-carrier having a series of projecting bag-molds, a series of traveling bag-carriers into which the bags are delivered from the molds, means for effecting such transfer of the bags from the molds to the carriers, and a stripper for tearing the bags from the molds if they are not properly delivered therefrom, substantially as specified.

36. The combination in a machine for packaging powdered or granular material, of an endless series of bag-carriers, means for filling the bags with material, a device for applying paste to the open mouth of the bag, said device acting in advance of the filling mechanism and a paste guard or shield introduced into the open, pasted mouth of the bag during the filling operation, substantially as specified.

37. In a machine for packaging powdered or granular material, mechanism for pasting the open mouth of the empty bag, said mechanism consisting of a slide having projections for applying paste to the inside of the bag-mouth, a plunger for vertically retaining the bag, means for vertically reciprocating said paster-slide and plunger, and means for applying paste to the projections of the paster-slide, substantially as specified.

38. In a machine for packaging powdered or granular material, mechanism for applying paste to the open mouth of the bag, said mechanism comprising means for simultaneously applying paste to the inside of the mouth on three sides thereof, and means for applying paste to the outside of the mouth on opposite sides thereof at the same time that the paste is being applied to the inside of the mouth, substantially as specified.

39. In a machine for packaging powdered or granular material, mechanism for applying paste to the open mouth of the bag, said mechanism comprising a vertically-reciprocating inside paster, and two sets of swinging paste-applying devices, one for applying paste to the outside of the bag-mouth and the other for applying paste to the reciprocating inside paster when the same is raised above the bag-mouth, substantially as specified.

40. In a machine for packaging powdered or granular material, mechanism for applying paste to the open mouth of the bag, said mechanism comprising a vertically-reciprocating inside paster, two sets of swinging paste-applying devices, one for applying paste to the outside of the bag-mouth and the other for applying paste to the reciprocating inside paster when the same is raised above the bag-mouth, and paste wheels or disks with which the paste-applying devices are brought into contact when swung outwardly, substantially as specified.

41. In a machine for packaging powdered or granular material, mechanism for applying paste to the open mouth of the bag, said mechanism comprising a vertically-reciprocating inside paster, two sets of swinging paste-applying devices one for applying paste to the outside of the bag-mouth and the other for applying paste to the reciprocating inside paster when the same is raised above the mouth of the bag, paste wheels or disks with which the swinging paste-applying devices are brought into contact when swung outwardly, and means for causing the paste-applying devices of each set to move from and toward each other when they are at the limit of their inward or outward swinging movement, substantially as specified.

42. In a machine for packaging powdered or granular material, mechanism for applying paste to the inside of the bag-mouth, said mechanism comprising a vertically-reciprocating inside paster, a paste-roll for applying paste to said paster when it is raised above the bag-mouth, a presser for forcing the bag into contact with the paster after it has been lowered into the bag-mouth, and mechanism connecting said presser and paste-roll carrier, whereby one will be retracted as the other is projected, substantially as specified.

43. The combination in a machine for packaging powdered or granular material, of mechanism for feeding bags forwardly in succession, with two sets of weighing and filling mechanism, each set including two or more weighing and filling devices adapted to fill a series of bags simultaneously, and means for operating said sets of weighing and filling mechanism alternately, substantially as specified.

44. The combination in a machine for packaging powdered or granular material, of bag-conveying devices, a shaft having cams for operating the same, a series of weighing and filling devices adapted to simultaneously fill a series of bags, a shaft with cams for operating said weighing and filling devices, and gearing connecting the two shafts and serving to reduce the speed of one in respect to the other to accord with the number of bags which have to be simultaneously filled, substantially as specified.

45. The combination in a machine for packaging powdered or granular material, of mechanism for feeding bags forwardly in succession, mechanism for applying paste successively to the open mouths of the individual bags, a shaft having cams for operating said bag conveying and pasting devices, a series of weighing and filling devices operating to simultaneously fill a series of bags, a shaft having cams for operating said weighing and filling devices, and gearing connecting the two shafts and serving to reduce the speed of one in respect to the other to accord with the number of bags which have to be simultaneously filled, substantially as specified.

46. The combination in a machine for packaging powdered or granular material, of mechanism for feeding bags forwardly in succession, mechanism for closing the mouths of the bags successively after they have been filled, a shaft having cams for operating said bag-feeding and mouth-closing devices, a series of weighing and filling devices operating to simultaneously fill a series of bags, a shaft having cams for operating said weighing and filling devices, and gearing connecting the two shafts and serving to reduce the speed of one in respect of the other to accord with the number of bags which have to be simultaneously filled, substantially as specified.

47. The combination in a machine for packaging powdered or granular material, of mechanism for internally pasting the open mouth of an empty bag, a feed-spout for delivering material into the bag, a tube for protecting the internally-pasted mouth of the bag, and means for reciprocating said tube so as to cause it to enter the mouth of the bag before the same is filled, and to be withdrawn after the filling has been accomplished, substantially as specified.

48. The combination in a machine for packaging powdered or granular material, of filling mechanism, mechanism for closing the tops of the filled bags, and a continuously-operating shaker for acting upon the filled bags, the forward end of said shaker being rounded or beveled, so that the bags can be moved over the same while it is being reciprocated, substantially as specified.

49. The combination in a machine for packaging powdered or granular material, of mechanism for filling bags, mechanism for closing the tops of the filled bags, a series of traveling bag-carriers open at top and bottom, an ejector for elevating the filled bags from said carriers, a side pusher for removing the bags from said ejector, a tilting table onto which the bags are delivered by said side pusher, and a traveling belt onto which the bags are delivered by said tilting table, substantially as specified.

50. The combination of the mold-wheel or conveyer-shaft, a notched wheel thereon, a swinging lever also having a notch therein, a plate free to swing with said lever and having a stud adapted to engage with its notch and also with the notches of the wheel, means for moving said plate in a direction at right angles to the plane of the wheel so as to carry its stud into and out of the notches of said wheel, and a locking-stud also moving in a plane at right angles to the plane of the wheel, substantially as specified.

51. The combination of the mold-wheel or conveyer-shaft, a notched wheel thereon, a swinging lever having opposite arms with notched ends, a plate free to swing with said lever and having studs adapted to engage with the notches in the same and with those in the notched wheel, means for moving said plate in a direction at right angles to the plane of the wheel so as to carry its studs into and out of the notches of said wheel, and a locking-stud also moving in a plane at right angles to the plane of the notched wheel, substantially as specified.

52. The combination of the mold-wheel or conveyer-shaft, a notched wheel thereon, a swinging lever also having a notch therein, a plate free to swing with said lever and having a stud adapted to engage with its notch, and also with the notches of the wheel, means for moving said plate in a direction at right angles to the plane of the notched wheel, a slide engaged by said plate, and a locking-stud carried by said slide and adapted to engage with the successive notches of the wheel, substantially as specified.

53. The combination in a machine for packaging powdered or granular material, of bag-making devices and traveling bag-carriers receiving the bags therefrom and bearing upon the sides of the bags only at and near the center, leaving the corner portions of the bags free from pressure whereby the frictional hold of the carriers upon the bags is reduced to a minimum and vertical movement of the bags in the carriers can be easily effected without expanding said carriers after the bags are filled, substantially as specified.

54. The combination of the bag-mold, means for bending a sheet of paper around three sides of the same, and lappers for lapping the paper on the fourth side of the mold, one of said lappers consisting of a roller mounted on the end of a swinging arm, which has a spring for pushing the roller outward, substantially as specified.

55. The combination of the bag-mold, means for bending a sheet of paper around three sides of the same, and lappers for lapping the paper on the fourth side of the mold, one of said lappers consisting of a roller centrally pivoted on the end of a swinging arm, and free to swing in a vertical plane, substantially as specified.

In testimony whereof I have signed my name to this specification in the presence of two subscribing witnesses.

JOHN R. OKELL.

Witnesses:
FRANK E. BECHTOLD,
CHARLES DE COW.